United States Patent
Shibao

(10) Patent No.: US 7,257,221 B2
(45) Date of Patent: Aug. 14, 2007

(54) METHOD OF CALLING UP CALLED PARTY, COMMUNICATION EQUIPMENT, CALLING PARTY INFORMATION SERVER, AND CALLING CONTROL DEVICE

(75) Inventor: Tadahide Shibao, Takaishi (JP)

(73) Assignee: Sharp Kabushiki Kaisha, Osaka (JP)

( * ) Notice: Subject to any disclaimer, the term of this patent is extended or adjusted under 35 U.S.C. 154(b) by 303 days.

(21) Appl. No.: 10/257,757

(22) PCT Filed: Mar. 30, 2001

(86) PCT No.: PCT/JP01/02843

§ 371 (c)(1),
(2), (4) Date: Oct. 17, 2002

(87) PCT Pub. No.: WO01/80542

PCT Pub. Date: Oct. 25, 2001

(65) Prior Publication Data

US 2003/0095654 A1    May 22, 2003

(30) Foreign Application Priority Data

Apr. 19, 2000    (JP)    ............................ 2000-118471

(51) Int. Cl.
*H04M 3/02*    (2006.01)
(52) U.S. Cl. ............. 379/373.04; 379/252; 379/142.06
(58) Field of Classification Search ........... 379/142.01, 379/142.04, 142.06, 142.14, 142.15, 142.17, 379/251–252, 373.01–4, 374.01–2
See application file for complete search history.

(56) References Cited

U.S. PATENT DOCUMENTS 4,720,848 A    1/1988    Akiyama (Continued)

FOREIGN PATENT DOCUMENTS

DE    4407671 A1    9/1994

(Continued)

OTHER PUBLICATIONS

"Digital Mova D502i Hyper Users Guide" Mitsubishi Electric Corporation, Jan. 2000.

*Primary Examiner*—Daniel Swerdlow
(74) *Attorney, Agent, or Firm*—Birch, Stewart, Kolasch & Birch, LLP

(57) ABSTRACT

To make a call, a calling-end terminal station (3) notifies a call-up control unit (71) of a communications network (7) of the terminal station number of a called-end terminal station (5) so as to cause it to stand by for a connection. The calling-end terminal station (3) notifies a calling party information server (9) of the calling-end-terminal-station number and the called-end-terminal-station number and instructs it to transmit to the called-end terminal station (5) calling party information stored in advance for the caller and called parties. The calling party information server (9) transmits the calling party information to the called-end terminal station (5) which in turn instructs the call-up control unit (71) to exit standby mode. This amounts to the communications network (7) calling up the called-end terminal station (5), resulting in the called-end terminal station (5) reproducing the received calling party information to alert the user to the call from the calling-end terminal station (3). If the user accepts the call, voice communication is started between the calling-end terminal station (3) and the called-end terminal station (5). A communications system is thereby realized whereby alert data to alert to a call can be altered according to the calling party with no settings at the called end.

19 Claims, 18 Drawing Sheets

U.S. PATENT DOCUMENTS

| | | | |
|---|---|---|---|
| 5,351,289 A * | 9/1994 | Logsdon et al. | 379/142.04 |
| 5,491,746 A | 2/1996 | Pinard | |
| 5,602,908 A * | 2/1997 | Fan | 379/142.06 |
| 5,848,142 A * | 12/1998 | Yaker | 379/215.01 |
| 5,926,537 A | 7/1999 | Birze | |
| 6,178,232 B1 * | 1/2001 | Latter et al. | 379/142.02 |
| 6,449,359 B1 * | 9/2002 | Luzzatto et al. | 379/373.01 |
| 6,728,354 B1 * | 4/2004 | Fleck et al. | 379/373.02 |

FOREIGN PATENT DOCUMENTS

| | | |
|---|---|---|
| EP | 0851649 A2 | 7/1998 |
| EP | 0973309 A2 | 1/2000 |
| GB | 2333209 A | 7/1999 |
| JP | 51-1005 | 1/1976 |
| JP | A-7-245656 | 9/1995 |
| JP | 9-162978 A | 6/1997 |
| JP | 11-122354 A | 4/1999 |
| JP | 11-284771 A | 10/1999 |
| JP | 2000-36871 A | 2/2000 |
| WO | WO 9805151 A1 * | 2/1998 |
| WO | 99/25107 A2 | 5/1999 |

* cited by examiner

METHOD OF CALLING UP CALLED PARTY, COMMUNICATION EQUIPMENT, CALLING PARTY INFORMATION SERVER, AND CALLING CONTROL DEVICE

This application is the national phase under 35 U.S.C. § 371 of PCT Internatonal Application No. PCT/JP01/02843 which has an International filing date of Mar. 30, 2001, which designated the United state of America.

TECHNICAL FIELD

The invention relates to a call-up method for a communications system which includes an alerting step for the called-end device to alert a user to an incoming call based on alert data, prior to a communications step for a calling-end device to establish communication with a called-end device over a communications network, and in particular, a call-up method capable of conveying information on the calling party based on alert data corresponding to the calling end in response to an incoming call with no settings in the called-end device, as well as a communications apparatus, a calling party information server, and call-up control device which execute the method.

BACKGROUND OF THE INVENTION

In mobile phone and other communications systems where the phone number of a calling party is conveyed to a called party, those mobile phones are used which are capable of conveying, in response to an incoming call, information on the calling party based on settings specified by a user in advance. For example, if the mobile phone has an address book where the mobile phone user has saved combinations of phone numbers and names, the mobile phone searches the address book for a name which matches the calling party's phone number received together with an incoming call and, if there is a match, displays that name. The user is thereby notified of the name of the calling party and can decide whether to accept the call by, for example, guessing its importance beforehand. Some new mobile phones are capable of displaying a portrait, as well as the name, of the calling party by additionally storing portraits in the address book.

There are also mobile phones in use equipped with an address book which may allow the mobile phone user to separate the phone numbers into groups and assign a different jingle to a different group. The phone will search the address book for a match based on the calling party's phone number and replay the jingle of the group to which the phone number belongs. The user can tell one group from another by the jingles.

These conventional technologies inevitably require that settings be made on the called end to make reference to the address book in the mobile phone at the called end. Setting up becomes increasingly bothersome as more and more people are added to the address book.

These problems are particularly serious with recent mobile phones and other communications devices capable of displaying character images and animation. Although the devices provide a wider variety of expressions which are easily and intuitively distinguishable, the creation of an intuitively identifiable character image or animation for each calling party tends to require increasing amounts of work.

DISCLOSURE OF THE INVENTION

The invention has an objective to offer a call-up method capable of changing alert data from which an alert to an incoming call is reproduced, in accordance with a calling party with no settings made at the called end, as well as a communications apparatus, a calling party information server, and call-up control device which execute the method.

To achieve the above objectives, a method of calling up a called party in accordance with the invention comprises the alerting step of alerting, prior to the communications step of causing a calling-end device to communicate with a called-end device over a communications network, to reception of a call by reproducing alert data at a called end, the method being characterized in that it further comprises:

the determining step of determining calling party information at a calling end;

the transmitting step of conveying to the called-end device transmitted data representative of the calling party information determined in the determining step; and the alert data designating step of designating the calling party information represented by the transmitted data as the alert data.

In the configuration, prior to the communications step, the calling end determines calling party information and transmits transmitted data representative of the calling party information to the called-end device. The transmitted data may be the calling party information itself or data which allows for identifying the calling party information, such as, identification code. In the latter case, the calling party information is distinguishable in transmitted data, and the called-end device can therefore acquire the calling party information, without the calling party information represented by the transmitted data, by, for example, acquiring the calling party information identified in the transmitted data from a server or the like storing calling party information. Besides, the transmitted data and the calling party information may be transmitted from the calling-end device to the called-end device directly over the communications network or through a calling party information server provided on the communications network to store calling party information in advance. In this case, the calling party information server transmits calling party information to the called-end device in response to an instruction from the calling-end device or the called-end device among others.

Whichever the case is, the called-end device identifies the calling party information and reproduces the calling party information as alert data, based on transmitted data conveyed, so as to alert the user to an incoming call. Further, the called-end device accepts the call and communicates with the calling-end device if it is in conditions to accept the call.

According to the configuration, the alert data reproduced by a called-end device upon the reception of a call prior to communications varies according to the calling party information determined at the calling end. As a result, the user of the called-end device can infer the calling party, emergency, etc. based on the alert data and determine whether he/she will accept the call.

Besides, since the calling party information is determined at the calling end, the user of the called-end device does not have to make any settings. This requires less work on the called party even when the calling party information (alert data) is animation or other types of media which requires a lot of work to make.

Incidentally, in the method of calling up a called party, the alert data is determined at the calling end, and there is a possibility that calling party information which the called end does not want to receive may be reproduced as alert data. Besides, the calling party information may be transmitted even when the transmission is needless: for example, when the user is not anywhere near the called-end device and the called end cannot accept the call whoever the calling party is. Such needless transmission adds to the burden on the communications network, especially when the calling party information consists of large data, such as animation or other types of moving pictures.

Therefore, a method of calling up a called party in accordance with the invention preferably comprises the above detailed steps and further comprises the specifying step of specifying in advance whether the calling party information is designated as the alert data.

According to the configuration, since it is specified at the called end in advance whether the calling party information is to be designated as alert data, the user of the called-end device can refuse unwanted calling party information. In addition, since the transmit of the calling party information can be omitted when no settings are required, a reduced amount of data needs to be transmitted over the communications network, which reduces the traffic on the communications network.

In addition to the above steps, the determining step may include the selecting step of selecting calling party information to be used in placement of a call from predetermined multiple sets of data that can be designated as calling party information when the call is placed.

According to the configuration, since calling party information is selected from multiple sets of data predetermined for each call, calling party information more suited to the conditions upon a call up can be determined without adding to the required work at the calling end than when calling party information is fixed. As a result, the called-end device can reproduce alert data which is more suited to the conditions upon a call up and more appropriately convey the conditions upon a call up.

Here, the calling party information may be transmitted from the calling-end device to the called-end device. In many cases, however, communications capacity is difficult to improve between the calling-end device and the communications network than of the communications path between the calling party information server and the communications network, because calling-end devices outnumber calling party information servers (detailed later). Especially, when the calling-end device is portable or other types of devices which connect to a communications network via a wireless communications path, communications capacity is more difficult to improve. As a result, transmitting calling party information which consists of large data, such as animation or other types of moving pictures adds to the traffic on the communications network. Besides, in this case, since the calling-end device needs to store each set of calling party information, even when the calling-end device is portable or other types of devices which is required to be small and lightweight rather than capacious, storage space cannot be reduced.

Therefore, the transmitting step preferably includes the step in which a calling party information server provided on the communications network to store calling party information transmits to the called-end device calling party information as transmitted data in response to an instruction from the calling-end device.

According to the configuration, the calling party information is transmitted from the calling party information server to the called-end device in response to an instruction from the calling-end device. Besides, the calling party information, once stored on the calling party information server, does not need to retransmitted from the calling-end device so far as the same calling party information is used. Therefore, the calling party information can be transmitted to the called-end device without adding to the storage space on the calling-end device or the traffic on the communications network when compared with the case where the calling party information is transmitted from the calling-end device for every call.

Besides, another transmitting method may further include the step in which, if the calling party information represented by the transmitted data received is not stored on the called-end device, the called-end device receives calling party information from a calling party information server provided on the communications network to store calling party information.

According to the configuration, the called-end device determines whether the calling party information represented by the transmitted data received is already stored and if not, receives calling party information from the calling party information server. As a result, similarly to the configuration in which the calling party information server transmits calling party information to the called-end device in response to an instruction from the calling-end device, no calling party information is transmitted from the calling-end device. The calling party information can therefore be transmitted to the called-end device without adding to the storage space on the calling-end device or the traffic on the communications network. In addition, if the calling party information is stored on the called-end device, no transmission is required from the calling party information server to the called-end device, further reducing the traffic on the communications network.

Incidentally, in cases where a calling party information server is provided, the called-end device may maintain line connection to the calling party information server and to the calling-end device simultaneously; the timing adjusting step however is preferably further included of delaying line connection between the calling-end device and the called-end device until the calling party information server completely transmits the calling party information.

According to the configuration, line connection between the calling-end device and the called-end device is delayed until the calling party information server completely transmits calling party information to the called-end device. Thus, even when there is only one line that can simultaneously connect the called-end device to the communications network, calling party information can be acquired from a calling party information server different from the calling-end device without any problems, thereby reducing the traffic on the communications network and simplifying the configuration of the called-end device when compared with a case where the called-end device simultaneously occupies two or more lines.

Meanwhile, a communications apparatus in accordance with the invention includes incoming call alerting means for alerting a user to an incoming call by reproducing predetermined alert data and communications means for when the incoming call is accepted, communicating with a calling-end device over a communications network, and to achieve the above objectives, is characterized in that the apparatus comprises:

receiving means for receiving from the communications network transmitted data representative of calling party information instructed for by the calling-end device; and alert data designating means for designating the calling party information represented by the transmitted data as the alert data.

Incidentally, similarly to the aforementioned method of calling up a called party, the transmitted data may be the calling party information itself or data which allows for identifying the calling party information. Besides, the transmitted data and the calling party information may be transmitted from the calling-end device to the communications apparatus as a called-end device directly over the communications network or through a calling party information server provided on the communications network to store calling party information in advance.

In the configuration, the receiving means, prior to communications by the communications means, receives transmitted data representative of calling party information instructed for by the calling-end device from the communications network, and the alert data designating means specifies the calling party information represented by the transmitted data as the alert data. Meanwhile, the incoming call alerting means reproduces the specified calling party information (alert data) to alert the user to the call. Further, if the call is accepted, the communications means initiates communications between the calling-end device and the communications apparatus as a called-end device.

Thus, the communications apparatus in the configuration works as a called-end device and alerts to the call by the aforementioned method of calling up a called party; therefore, the alert data reproduced by a called-end device upon the reception of a call prior to communications can be changed according to the calling party information specified at the calling end. As a result, the user of the called-end device can infer the calling party, emergency, etc. based on the alert data without special settings as with prior art, and determine, for example, whether he/she will accept the call.

Besides, a communications apparatus in accordance with the invention may include, in addition to the foregoing configuration, specifying means for specifying whether or not to activate the alert data designating means. According to the configuration, it can be determined whether to specify the calling party information as alert data using specifying means in the communications apparatus which serves as a called end. As a result, the aforementioned unwanted calling party information can be refused, the traffic on the communications network can be reduced.

Further, a communications apparatus in accordance with the invention may include, in addition to either of the foregoing configurations, calling party information acquiring means for accessing a predetermined calling party information server based on the transmitted data to receive calling party information represented by the transmitted data.

According to the configuration, since the calling party information is transmitted from the calling party information server provided on the communications network to the communications apparatus as a called-end device, the calling-end device only has to notify the communications apparatus of transmitted data representative of the calling party information. As a result, the calling party information can be transmitted to the communications apparatus without adding to the storage space on the calling-end device or the traffic on the communications network when compared with the case where the calling party information is transmitted from the calling-end device for every call.

Besides, a communications apparatus in accordance with the invention may include, in addition to either of the foregoing configuration, storage means for storing calling party information in association with transmitted data received and transmission inhibiting means for, if there is stored calling party information corresponding to transmitted data received by the receiving means in the storage means, inhibiting transmission of new calling party information from the communications network.

In the configuration, if the storage means of the communications apparatus has calling party information corresponding to the transmitted data stored thereon, the transmission inhibiting means inhibits transmission of new calling party information by, for example, refusing reception when notified from the calling-end device, the calling party information server, or the like that calling party information is to be transmitted or issuing no request when the communications apparatus at the called end makes a request to the calling party information server for calling party information. As a result, the traffic is reduced on the communications network when compared with the configuration in which the communications apparatus receives calling party information for every call.

Meanwhile, a calling party information server in accordance with the invention, to achieve the above objectives, is characterized in that it includes:

storage means for storing calling party information enabling a called-end device to alert to an incoming call;

registering means for registering calling party information in advance in the storage means in association with a calling-end device based on an instruction of a user of the calling-end device; and calling party information transmitting means for transmitting to the called-end device the calling party information stored in the storage means in association with the calling-end device after the calling-end device places a call, and before the called-end device accepts the call.

According to the configuration, the user of the calling-end device instructs the registering means in the calling party information server to store on the storage means calling party information in association with the calling-end device. Meanwhile, as the calling-end device places a call, the calling party information transmitting means in the calling party information server detects the call by means of notification or the like from, for example, the calling-end device, the called-end device, or the communications network and then transmits the calling party information, corresponding to the calling-end device, which is read out from the storage means to the called-end device before the called-end device accepts the call. Thus, the calling party information specified at the calling end is transmitted to the called-end device and used by the called-end device to alert to the call.

Meanwhile, a calling party information server in accordance with the invention, to achieve the above objectives, is characterized in that it includes:

storage means for storing calling party information enabling a called-end device to alert to an incoming call; and calling party information transmitting means for reading out the calling party information from the storage means based on an instruction from a calling-end device and transmitting the readout calling party information to the called-end device before the called-end device accepts the call.

According to the configuration, the calling party information transmitting means reads out calling party information from the storage means based on an instruction from the calling-end device for transmission to the called-end device. Thus, the calling party information specified at the calling end is transmitted to the called-end device and used by the called-end device to alert to the call.

Like these, the calling party information servers having the foregoing configurations transmit calling party information for alerting to a call by the aforementioned method of calling up a called party; therefore, without any special settings as in conventional techniques, the user of the called-end device can infer the calling party, emergency, etc. based on alert data and determine whether to accept the call. Besides, since the calling party information is transmitted from the calling party information server, the traffic is reduced on the communications network when compared with the case where the information is transmitted from the calling-end device for every call.

Besides, a call-up control device in accordance with the invention, to achieve the above objectives, is provided on a communications network which is connectable to a calling-end device, a called-end device, and a calling party information server of the aforementioned configuration and characterized in that if a call-up of the called-end device by the calling-end device is detected, the call-up control device holds the call-up of the called-end device until the calling party information is completely transmitted from the calling party information server to the called-end device.

In the configuration, if a call-up of the called-end device by the calling-end device is detected, the call-up control device holds the call-up of the called-end device until the calling party information server completely transmits calling party information to the called-end device. Upon the completion of the transmission, the call-up control device calls up the called-end device. As a result, a called-end device which can be connected to the communications network only by a single line can receive calling party information from a calling party information server other than the calling-end device without any problems before the called-end device accepts a call made by the calling-end device. Therefore, the traffic is reduced on the communications network and the configuration of the called-end device is simplified, when compared with the case where the called-end device solely occupies two or more lines to receive calling party information.

For a fuller understanding of the nature, advantages, and benefits of the invention, reference should be made to the ensuing detailed description taken in conjunction with the accompanying drawings.

BEST MODES OF THE INVENTION

The following will discuss the invention in more detail by way of embodiments and comparative examples, which by no means restricts the invention.

Embodiment 1

Figure 1:
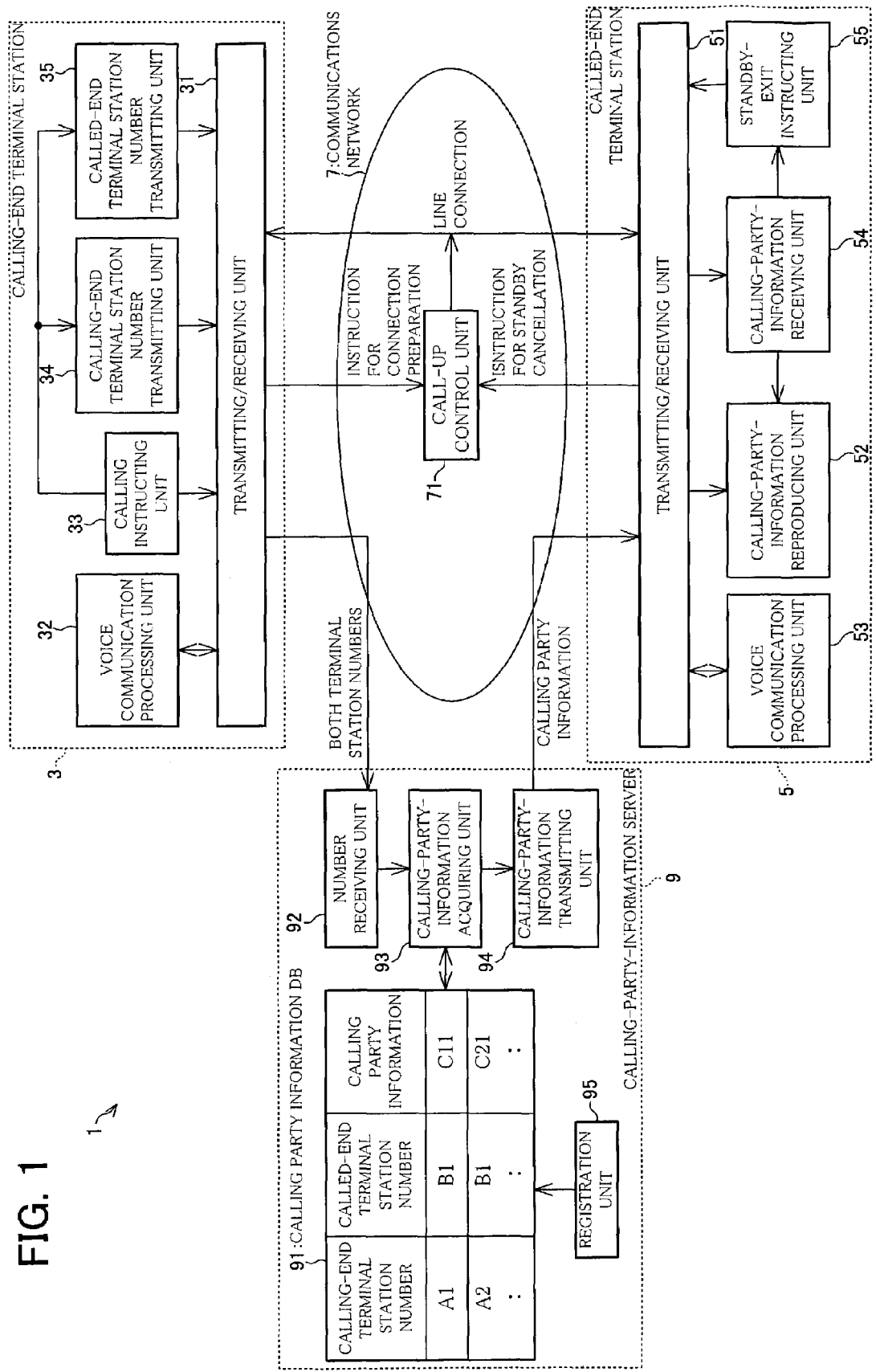
FIG. 1, showing an embodiment of the invention, is a block diagram of the configuration of major parts of a communications system.
Figure 2:
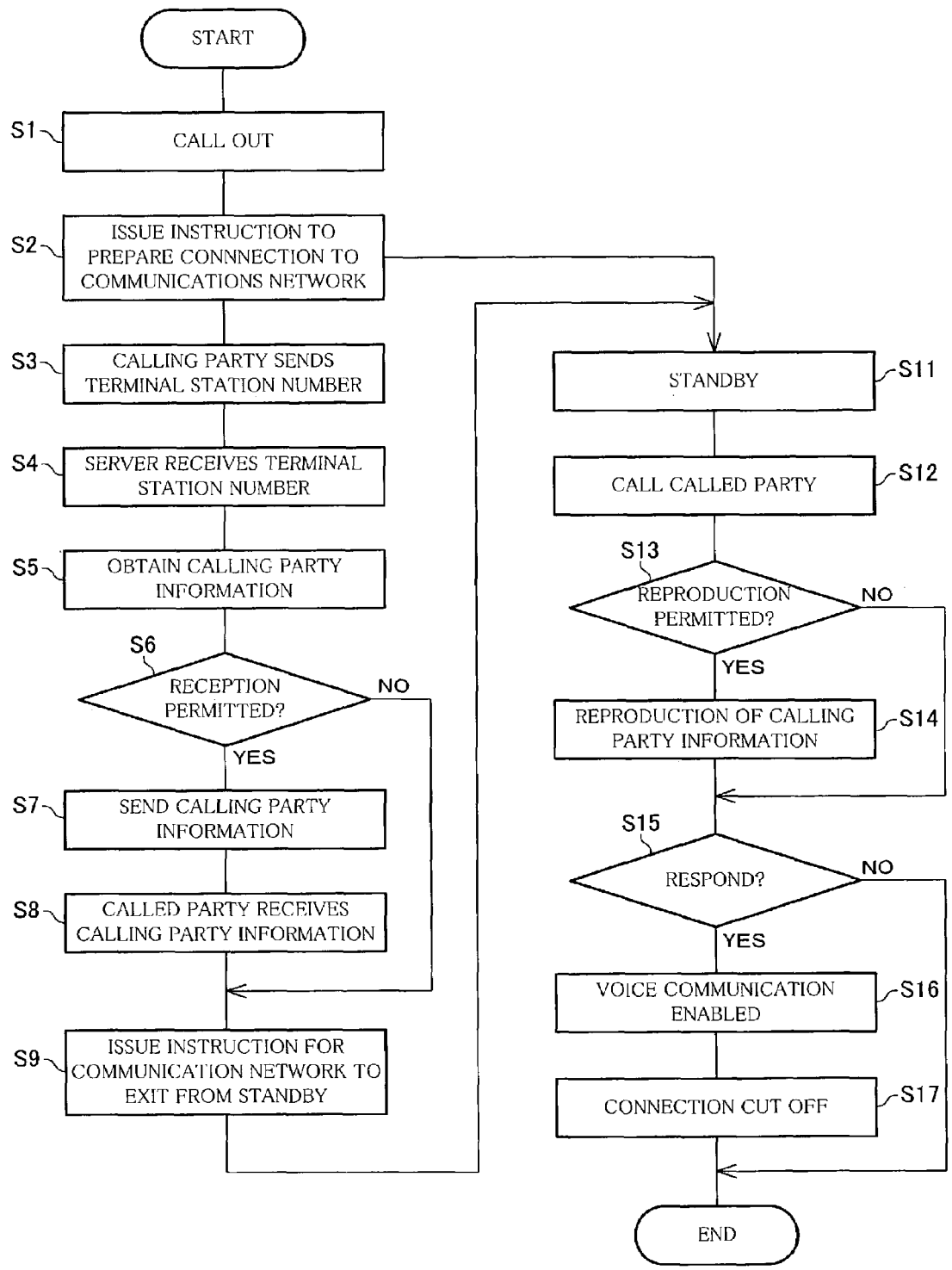
FIG. 2 is a flow chart describing operations of various parts of the communications system to initiate a call.

The following will describe an embodiment of the invention in reference to FIGS. 1, 2. A communications system 1 of the present embodiment enables a called-end device to, prior to the establishment of voice communication, alert a user to an incoming call by, for example, reproducing a jingle, animation, or other information on the calling party. As shown in FIG. 1, the system 1 includes: terminal stations 3, 5 serving as a calling-end device and a called-end device (communications apparatus) respectively; a communications network 7 (e.g., public network or packet communications network) connecting the two terminal stations 3, 5; and a calling party information server 9 which stores calling party information specified in advance by a calling party and transmits that information to the called-end terminal station 5 for reproduction to alert a user to an incoming call when the calling-end terminal station 3 makes a call to the called-end terminal station 5.

In the configuration, the calling party information based on which the called-end terminal station 5 alerts the user to an incoming call is the calling party information transmitted from the calling party information server 9, that is, the calling party information specified in advance by the calling party. With no settings or specification made by the called party, the called-end terminal station 5 can switch the calling party information for alert reproduction in response to an incoming call so that the information matches the calling party.

The description below assumes, as a preferred example, that the terminal stations 3, 5 are mobile phones or other hand-held terminal station devices; the invention is however not restricted to mobile phones and other wireless communications systems, but widely applicable to fixed-wire-based communications systems. The calling party information may be conveyed as sounds, such as a jingle (alert jingle), or images, be it still or animated (alert animation), as long as more than one set of information can be specified to distinguish between calling parties when alerting the user to an incoming call, that is, before the called party responds to the incoming call. The information may be given as light, such as flickering of a light source, or vibration. The following description will be made assuming that the calling party information is conveyed as animated images.

Accordingly, the called-end terminal station 5 of the present embodiment includes, for example: a transmitting/receiving unit 51 capable of connecting to the communications network 7 via a wireless communications path or the like by, for example, communicating with a base station (not shown); a calling party information reproducing unit (incoming call alerting means) 52 which alerts the user to the reception of a call by means of reproduction from predetermined calling party information when the transmitting/receiving unit 51 is notified of an outgoing call from the calling-end terminal station 3 over the communications network 7; and a voice communication processing unit (communications means) 53 which handles voice communication with the calling-end terminal station 3 when the user responds to the call. Note in the present embodiment that the calling party information is given in the form of animation and also that the calling party information reproducing unit 52 alerts the user to the reception of a call by displaying the calling party information received by a calling-party-information receiving unit 54 as an animated image on a liquid crystal display or like display unit.

The called-end terminal station 5 of the present embodiment further includes: the calling-party-information receiving unit 54 which, before alerting the user to the reception of a call, receives the calling party information output from the calling party information server 9 which matches the calling-end terminal station 3 and also causes the calling party information reproducing unit 52 to reproduce an alert from the calling party information; and a standby-exit instructing unit 55 which instructs a call-up control unit 71 (will be detailed later) delaying a call-up from the calling-end terminal station 3 to the called-end terminal station 5 to exit the standby mode by, for example, transmitting a request for connection to a predetermined number when the reception of the calling party information is finished. In the present embodiment, the calling party information is received as such as the transmitted data recited in claims; therefore the calling-party-information receiving unit 54 corresponds to the alert data designating means, setting means, and receiving means recited in claims.

Meanwhile, the calling-end terminal station 3 includes: a transmitting/receiving unit 31 and a voice communication processing unit 32 which are respectively similar to the transmitting/receiving unit 51 and the voice communication processing unit 53; a calling instructing unit 33 where an instruction is made for a call to be made the called-end terminal station 5 by, for example, manipulating keys, entering a phone number directly, or selecting a desired number (called party) from those registered in advance; and calling and called ends' terminal station number transmitting units 34, 35 which notify the calling party information server 9 of the numbers of the calling and called ends' terminal stations 3, 5 by, for example, making a call to a predetermined phone number when there is an instruction for a call.

As with ordinary and other kinds of wireless phone networks, the communications network 7, when receiving a connection request from any given device capable of connecting to the communications network 7, notifies a device stipulated in the request of the reception of a call and, when the called-end device responds to the call, establish connection between the two devices. Further, the communications network 7 of the present embodiment includes the call-up control unit (call-up control device) 71 which delays a call-up from the calling-end terminal station 3 to the called-end terminal station 5 and calls up the called-end terminal station 5 only after the called-end terminal station 5 has received the calling party information.

This reduces the number of lines required at any moment and thus the traffic on the communications network 7, compared to a case where the calling party information is transmitted via a second line after connection is established via a first line between the calling-end terminal station 3 and the called-end terminal station 5. Further, when the called-end terminal station 5 has only one line available to establish connection, the called-end terminal station 5 is connected to the calling-end terminal station 3 via a line without any problem after the calling party information server 9 transmits the calling party information, which allows for a simplified configuration of the called-end terminal station 5 in comparison with establishing connection via two or more lines.

Meanwhile, the calling party information server 9 of the present embodiment, arranged so as to transmit the calling party information identified by means of the calling-end terminal station number and the called-end terminal station number, includes: a calling party information data base (DB) 91 which stores the calling party information in association with the two terminal station numbers; a number receiving unit 92 which receives the numbers of the calling and called-end terminal stations from the two terminal station number transmitting units 34, 35 in the calling-end terminal station 3; a calling-party-information acquiring unit 93 which acquires the calling party information corresponding to the two terminal station numbers received by making reference to the calling party information DB 91; a calling party information transmitting unit 94 which transmits the calling party information acquired by the calling-party-information acquiring unit 93 to the calling-party-information receiving unit 54 in the called-end terminal station 5 by, for example, calling at the called-end terminal station number received by the number receiving unit 92. The calling party information server 9 further includes a registration unit 95 which receives data representative of a combination of the calling and called-end terminal station numbers and the calling party information the calling-end terminal station 3 per se, or any another information device operated by the calling party over the communications network 7 and registers that combination of the two numbers and the calling party information with the calling party information DB 91.

The calling party information DB 91 in the calling party information server 9 may store frames in bitmap format when the animation as the calling party information is stored, in which case the calling party information server 9 transmits the bitmap frames as the calling party information to the called-end terminal station 5 where the calling party information reproducing unit 52 displays each bitmap frame sequentially to replay the animation.

When the animation is stored, key frames, constituting features of each frame, may be described using combinations of geometric patterns like circles, squares, and letters, in which case the calling party information reproducing unit 52 in the terminal station 5 reproduces the animation by producing frames by means of interpolation of frames between the key frames where necessary and drawing geometric patterns constituting the frames. When stored as key frames, the calling party information DB 91 preferably stores data representative of geometric patterns corresponding between the key frames, in which case the interpolation can be done more suitably by interpolating so that differing positions and colors change smoothly in the corresponding geometric patterns. The workload on the terminal station 5 reduces If the interpolation is done in the calling party information server 9 which has relatively sufficient operating capability, rather than in the terminal station 5, before the interpolated frames are transmitted.

An alternative way to store is to store animation of possible movements of each character and store the animation as combinations of movements, in which case the data representative of the combinations of movements of a character and at least the animation of movements are transmitted from the calling party information server 9 to the terminal station 5 where the calling party information reproducing unit 52 reproduces the animation of movements in the sequence of the combinations to reproduce the animation.

The calling party information DB 91 uses less of its storage space by hence storing as combinations of key frames or combinations of characters and movements, than by storing each frame in bitmap format, and especially so in the communications system 1 of the present embodiment in which the calling party information server 9 stores calling party information (animation) of each user and enables data representative of common geometric patterns and character images to be shared among the users.

Further, the registration unit 95 may conveyed animated images or combinations of characters and movements to the calling-end terminal station 3 for selection by the user of the terminal station 3, which enables the animation as the calling party information to be created without producing each frame of the animation and thus greatly saves labor in creating it. In this configuration, the calling party information server 9 stores the animation as the calling party information, and the communications system 1 as a whole requires a reduced amount of storage space when compared to a case where a separate server storing animation, character images, and movements is provided for animation production The members constituting the devices (3, 5, 71, 9) and the like shown in FIG. 1 may be function blocks realized by a CPU or other operating means running a program stored on a recording medium, such as a ROM or RAM or may be realized by means of hardware which handles the same process. A further alternative is a combination of hardware responsible for part of the process and operating means controlling the hardware and running a program responsible for the rest of the process. Further, there may be provided a single operating means or multiple operating means connected with each other via an internal bus or various communications paths to run a program in concert.

Program data representative of the program itself or program-creating data is stored on a recording medium, and the recording medium is distributed, or the program data is distributed by means of transmission via wired or wireless communications means, so that the program can be run by the operating means.

Here, the recording medium used in the distribution of the program data is preferably of removable types; however, the recording medium after the program data is distributed may be either removable or irremovable. The recording medium may be rewriteable or non-rewriteable, volatile or non-volatile, and come in any shape and operate in any recording method, as long as the medium can store the program data. Some examples of such recording media include tapes, such as magnetic tapes and cassette tapes; magnetic disks, such as floppy disks and hard disks; and other types of disks including CD-ROMs, magneto-optical disks (MOs), mini disks (MDs), and digital video disks (DVDs). The recording medium may be a card, such as an IC card or an optical card, or a semiconductor memory of any type, such as a mask ROM, an EPROM, an EEPROM, or a flash ROM.

The program data may be codes to instruct the operating means for all the procedures of the processes or, if there is already a basic program (for example, operating system or library) which can perform part or the entirety of the processes by calling up according to predetermined procedures, the procedures may be partly or entirely replaced with codes or a pointer to instruct the operating means to call up the basic program.

Further, the storage manner to store the program data on the recording medium may be a storage manner whereby operating means can access and run the program as if it was loaded in actual memory, one before loading into actual memory and after installation in a local recording medium (for example, actual memory or hard disk) which is always accessible to operating means, or one before installation in the local recording medium from a network or mobile recording medium. The program data is not restricted to compiled object codes, but may be source codes, or intermediate codes created in the middle of interpretation or compilation. In either case, the same effects can be obtained regardless of in which manner the program data is stored on the recording medium, as long as the program data can be converted by a single or combined operations of decompression, decoding, interpretation, compilation, linking, or loading into an actual memory so that it is executable to the operating means.

Now, referring to the flow chart in FIG. 2, the following will describe operations of the calling-end terminal station 3 calling up the called-end terminal station 5 in the foregoing communications system 1. In step 1 (hereinafter, will be abbreviated as S1), as a user instructs the calling instructing unit 33 to make a call by, for example, entering a called-end terminal station number, the calling instructing unit 33, in S2, instructs the call-up control unit 71 on the communications network 7 to inform of the called-end terminal station number and prepare for connection to the called-end terminal station 5. As will be detailed later, the call-up control unit 71, when it becomes ready, enters standby mode and delays the call-up of the called-end terminal station 5 until otherwise instructed by the called-end terminal station 5.

Further, as the calling instructing unit 33 picks up a calling instruction in S1, the calling-end-terminal-station-number transmitting unit 34 instructs the transmitting/receiving unit 31 to transmit the number of the device (calling-end terminal station number) stored in a memory (not shown) to the calling party information server 9 in S3. The called-end terminal station number transmitting unit 35 then receives the called-end terminal station number from the calling instructing unit 33 and transmits it to the calling party information server 9.

Meanwhile, in the calling party information server 9, the number receiving unit 92 receives the calling-end terminal station number and the called-end terminal station number from the two terminal station number transmitting units 34, 35 in S4, and the calling-party-information acquiring unit 93 acquires calling party information that matches the two numbers by referring to the calling party information DB 91 in S5. Then, in S6 and S7, the calling party information transmitting unit 94 calls the called-end terminal station number received in S4 and if settings are made in advance so that the called-end terminal station 5 will receive calling party information (YES in S6), transmits the calling party information acquired in S5 (S7).

As the calling party information is transmitted over the communications network 7 and received by the calling-party-information receiving unit 54 in the called-end terminal station 5 (S8), the standby-exit instructing unit 55 instructs the call-up control unit 71 of the communications network 7 to exit from standby mode (S9). If the called-end terminal station 5 refuses to receive the calling party information (NO in S6), the standby-exit instructing unit 55 issues an instruction to exit from standby mode in S9 without the calling party information being transmitted over the communications network 7.

Here, the call-up control unit 71, responding to the instruction in S2, has prepared to connect to the called-end terminal station 5 before entering standby mode shown in S11. Under these circumstances, the call-up control unit 71, when receiving an instruction from the standby-exit instructing unit 55, exits standby mode in S12, and calls up the called-end terminal station 5.

Meanwhile, the calling party information reproducing unit 52 in the called-end terminal station 5 receives from the calling-party-information receiving unit 54 the calling party information received in S7 and has prepared for reproduction from the calling party information. Upon the detection of a call-up from the call-up control unit 71, the calling party information reproducing unit 52 alerts the user to the reception of the call based on the calling party information in S14 if such settings are made in advance (YES in S13).

Here, as shown in, for example, FIG. 1, suppose that the calling-party-information acquiring unit 93 in the calling party information server 9 stores calling party information C11 corresponding to a calling-end terminal station number A1 and a called-end terminal station number B1 and calling party information C21 corresponding to a calling-end terminal station number A2 and a called-end terminal station number B1. The arrangement enables the calling party information reproducing unit 52 in a called-end terminal station 5 (terminal station 5 of the terminal station number B1) to alert the user to the reception of a call based on the calling party information C11 if the call comes from the terminal station 3 of the terminal station number A1 and on the calling party information C21 if the call comes from the terminal station 3 of the terminal station number A2. Consequently, the called-end terminal station 5 is capable of alerting its user to a call based on the calling party information which matches the calling-end terminal station 3 with no special settings made at the called party.

Further, if the user responds to the call (YES in S15) by, for example, pressing a predetermined voice communication button, connection is established between the calling-end terminal station 3 and the called-end terminal station 5, and the voice communication processing units 32, 53 in the two terminal stations 3, 5 transmits voice of the respective users to each other to enable voice communication between them (S16). When voice communication is completed and an instruction is made for the termination of the connection, the connection between the two terminal stations 3, 5 is terminated (S17).

If the user does not respond to the call (NO in S15), communication may be terminated with no connection established between the calling-end terminal station 3 and the called-end terminal station 5 or the called-end terminal station 5 may notify the calling-end terminal station 3 that the terminal station 5 cannot respond to the call by, for example, transmitting a predetermined, voice or animated image return message.

If the user of the called-end terminal station 5 has made in advance those settings that do not allow reproduction from the calling party information (NO in S13), the calling party information reproducing unit 52 in the called-end terminal station 5 alerts the user to a call not based on the calling party information, but by, for example, predetermined sound or vibration. Either different or common settings may be made for different calling-end terminal station numbers whether to reproduce an alert based on the calling party information.

In either event, it can be determined at the called-end terminal station 5 whether to allow reproduction from on the calling party information, enabling the prevention of reproduction from calling party information that the user of the called-end terminal station 5 does not want to receive, for example, unpleasant sound and movies. In the example shown in FIG. 2, if the called-end terminal station 5 refuses to receive calling party information, the transmission of the calling party information is suspended (NO in S6). This is not the only available option: for example, substantially the same effects are obtained by receiving the calling party information but not reproducing an alert from the information. However, when no alert is necessarily reproduced from calling party information as in the present embodiment, suspending the transmission of the calling party information will reduce the traffic on the communications network 7.

As detailed above, in the communications system 1 of the present embodiment, the calling-party-information receiving unit 54 in the called-end terminal station 5 receives the calling party information determined by the user of the calling-end terminal station 3, and the calling party information reproducing unit 52 plays an alert reproduced from the calling party information, alerting the user of the called-end terminal station 5 to a call. As a result, the calling party information from which an alert is reproduced when a call is received (S14) before the voice communication step (S16) changes according to an instruction from the user of the calling-end terminal station 3. This enables the user of the called-end terminal station 5 to figure out the calling party, emergency, etc. from the calling party information to determine in S15 whether to accept the call.

Further, the calling party information is determined at the calling end, and the user of the called-end terminal station 5 does not have to make any settings. This saves the user of the called-end terminal station 5 from heavy workload even when the calling party information (alert data) contains animation or other kinds of media that require a lot of work to create.

Note that the determination of the calling party information at the calling end requires more work to be done at the calling end than with conventional technologies where settings are made at the called end. Nevertheless, if the calling party information contains a portrait, trademark, other kind of data that is unique to the calling party, a common set of data can be used for all called parties. Hence, the called and calling parties can save a combined amount of work.

Here, the calling party information may be directly transmitted from the calling-end terminal station 3 to the called-end terminal station 5. However, in the present embodiment, there is provided the calling party information server 9 separately from the calling-end terminal station 3, and the calling party information is transmitted from the calling party information server 9. As a result, the traffic between the calling-end terminal station 3 and the communications network 7 can be reduced when compared to the calling-end terminal station 3 transmitting the calling party information for every call. Here, the calling party information servers 9 may be less than the calling-end terminal stations 3, communication capability is enhanced more readily between the calling party information server 9 and the communications network 7 than between the calling-end terminal station 3 and the communications network 7. Further, communications capacity can be more readily improved than the calling-end terminal station 3 connected to the communications network 7 via a wireless communications path, since the calling party information server 9 is not mobile and connected via wires. As a result, the traffic on the communications network 7 can be reduced by transmitting the calling party information from the calling party information server 9.

In addition, the calling-end terminal station 3 often has limited storage space for reduced dimensions and weight and hence better mobility, when compared to the calling party information server 9 which is installed permanently at a fixed place. However, in the forgoing configuration, the calling-end terminal station 3 does not need to store calling party information and can cut down on its storage space. This offers better mobility than in cases where the calling-end terminal station 3 stores the calling party information for transmission.

Further, in the communications system 1 of the present embodiment, with the communications network 7 provided with a call-up control unit 71, the call-up of the called-end terminal station 5 and connection between the calling-end terminal station 3 and the called-end terminal station 5 are delayed until the transmission of the calling party information from the calling party information server 9 to the called-end terminal station 5 is completed. This enables the called-end terminal station 5 to receive calling party information from the calling party information server 9, not the calling-end terminal station 3, with no trouble even when there is only one line available to connect to the communications network 7. As a result, reduces the traffic on the communications network 7 and simplifies the configuration of the called-end terminal station 5 in comparison with the called-end terminal station 5 establishing connection to both the calling-end terminal station 3 and the calling party information server 9.

Embodiment 2

Incidentally, embodiment 1 described the calling party information server 9 identifying calling party information based on the calling-end terminal station number and the called-end terminal station number. In contrast, referring to FIG. 3 to FIG. 5, the present embodiment will describe a calling-end terminal station selecting calling party information upon making a call.

Figure 3:
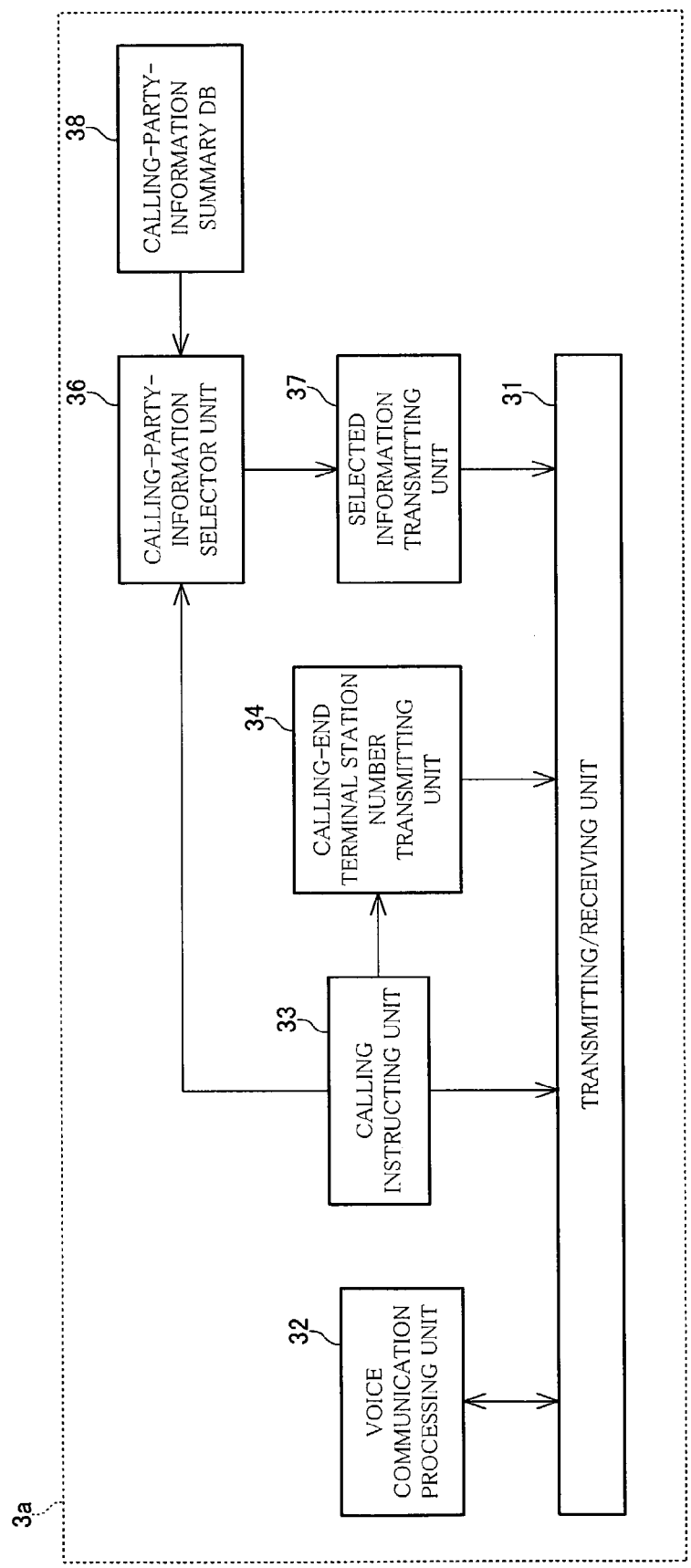
FIG. 3, showing another embodiment of the invention, is a block diagram of the configuration of major parts of a calling-end terminal station.

Referring to FIG. 3, a calling-end terminal station 3a in a communications system 1a of the present embodiment includes a calling party information selector unit 36, replacing the called-end terminal station number transmitting unit 35, which selects one of predetermined sets of calling party information for use with a current call; and a selected information transmitting unit 37 which transmits selected information representative of the selected set of calling party information to a calling party information server 9a. Further, the calling-end terminal station 3a includes a calling party information summary DB 38 which stores images and text which schematically represent calling party information registered with the calling party information server 9a, enabling the calling party information selector unit 36 to show the gist of calling party information to the user and encourage the user to make a selection.

Figure 4:
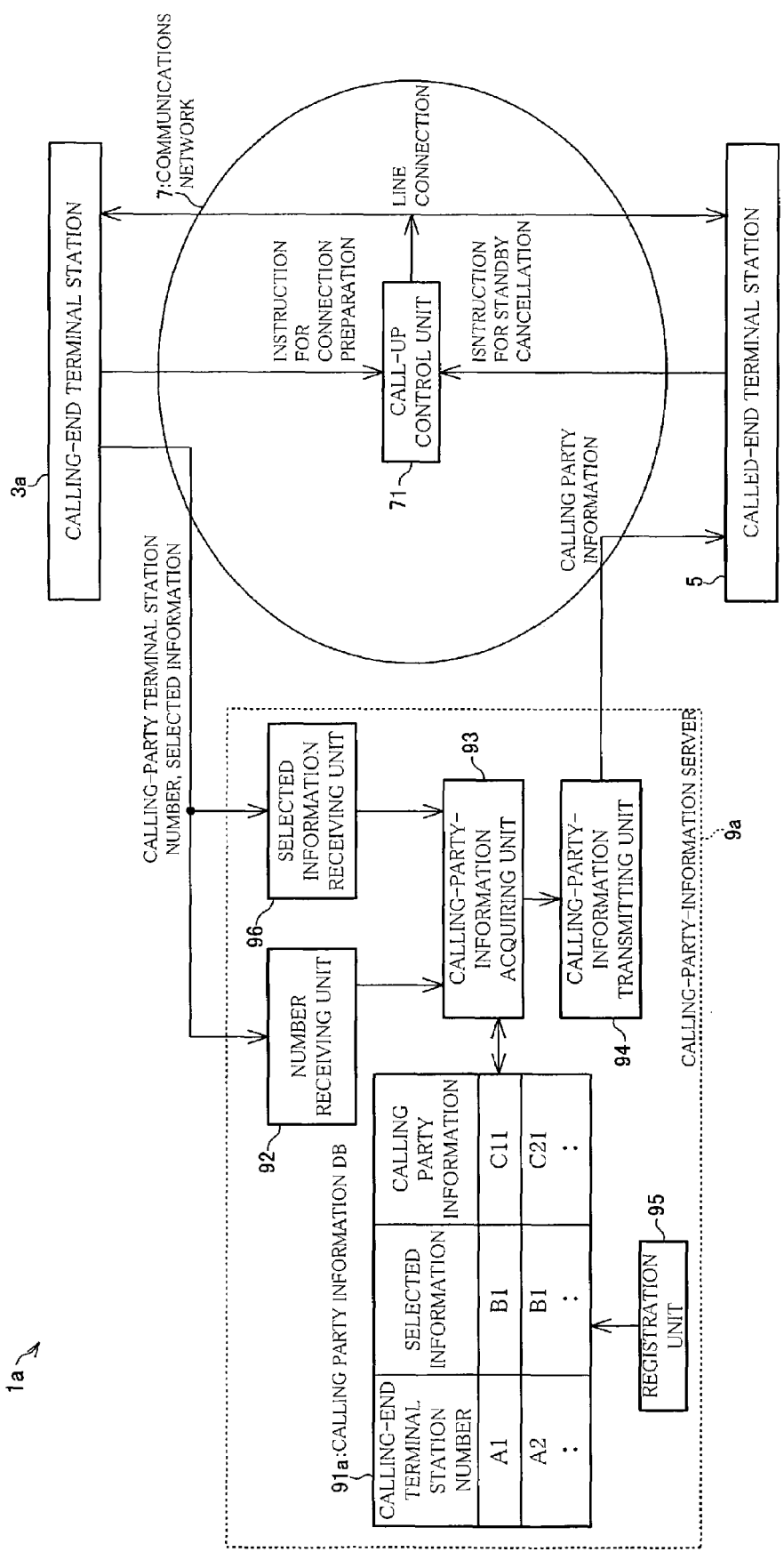
FIG. 4 is a block diagram of the configuration of major parts of a communications system including the calling-end terminal station.

Meanwhile, referring to FIG. 4, the calling party information server 9a includes a calling party information DB 91a which stores a calling-end terminal station number and a combination of a set of selected information and a set of calling party information, in place of the calling party information DB 91 which stores a calling-end terminal station number and a combination of a called-end terminal station number and a set of calling party information. The calling party information server 9a further includes a selected information receiving unit 96 which receives the selected information, and the calling-party-information acquiring unit 93 identifies the calling party information to be transmitted to the called-end terminal station 5 based on the calling-end terminal station number received by the number receiving unit 92 and the selected information received by the selected information receiving unit 96 in reference to the calling party information DB 91a. The calling-end terminal station number and a combination of the selected information and the calling party information are registered from the calling-end terminal station 3a or another information device used by the user of the terminal station 3a to the calling party information DB 91a in the calling party information server 9a prior to placement of a call in the same manner as in embodiment 1.

Figure 5:
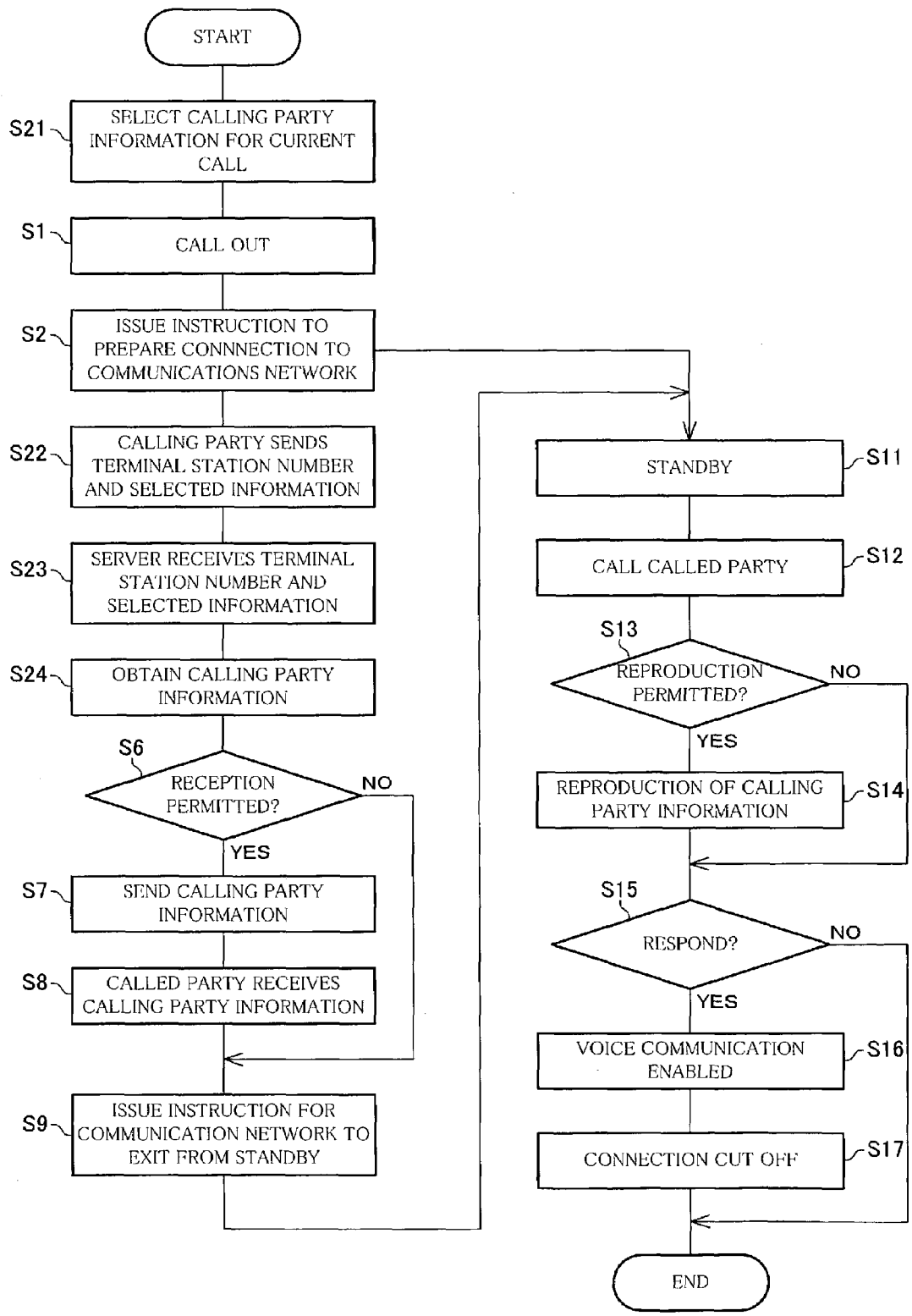
FIG. 5 is a flow chart describing operations of various parts of the communications system to initiate a call.

In this configuration, as shown in FIG. 5, in S21 executed prior to those steps shown in FIG. 2, the calling party information selector unit 36 refers to the calling party information summary DB 38 to present the gist of the calling party information registered in the calling party information server 9a and selects a set of calling party information for use with the current call according to an instruction from the user, under predetermined conditions, etc. Further, S22 to S24 provided in place of S3 to S5, the selected information representative of the calling party information for use with the current call and the calling-end terminal station number are transmitted from the calling-end-terminal-station-number transmitting unit 34 and the selected information transmitting unit 37 in the calling-end terminal station 3a to the number receiving unit 92 and the selected information receiving unit 96 in the calling party information server 9a. The calling-party-information acquiring unit 93 reads the calling party information DB 91a for calling party information which matches the selected information and the calling-end terminal station number. The same operations as those in FIG. 2 are performed in subsequent processes.

With the configuration, for every call, a set of calling party information for use with the call is selected from sets of calling party information registered in advance in the calling party information server 9a. This makes it possible to determine calling party information when making a call, which is not the case in embodiment 1 where the calling party information is determined which corresponds to the calling-end terminal station number and the called-end terminal station number. The calling-end terminal station 3a thereby can make an instruction for transmission of calling party information more suitable to situations of the calling party. As a result, the called-end terminal station 5 can perform reproduction, based on calling party information, which better suits the situations at the time of calling and more appropriately conveys the situations at the time of calling to the user of the called-end terminal station 5.

Further, the calling-end terminal station 3a of the present embodiment includes a calling party information summary DB 38 which presents the gist of calling party information available for selection by the calling party information selector unit 36 to encourage the user to make a selection, with less work.

Embodiment 3

Incidentally, embodiment 1 described the calling-end terminal station which instructs the calling party information server to transmit calling party information. Referring to FIG. 6 to FIG. 9, the present embodiment will describe the called-end terminal station which, in response to a instruction form the calling-end terminal station, instructs the calling party information server for transmission.

Figure 6:
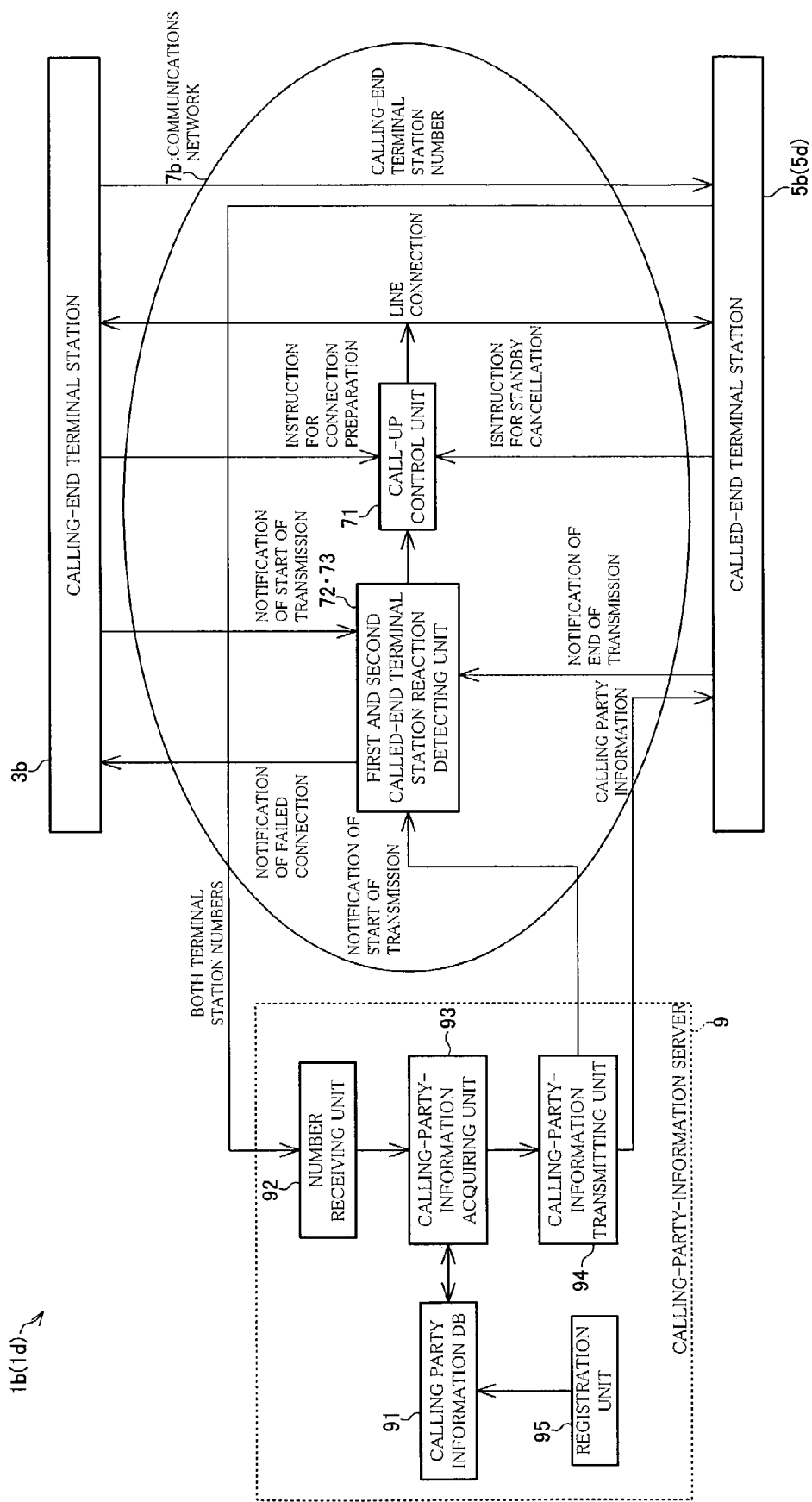
FIG. 6, showing a further embodiment of the invention, is a block diagram of the configuration of major parts of a communications system.
Figure 7:
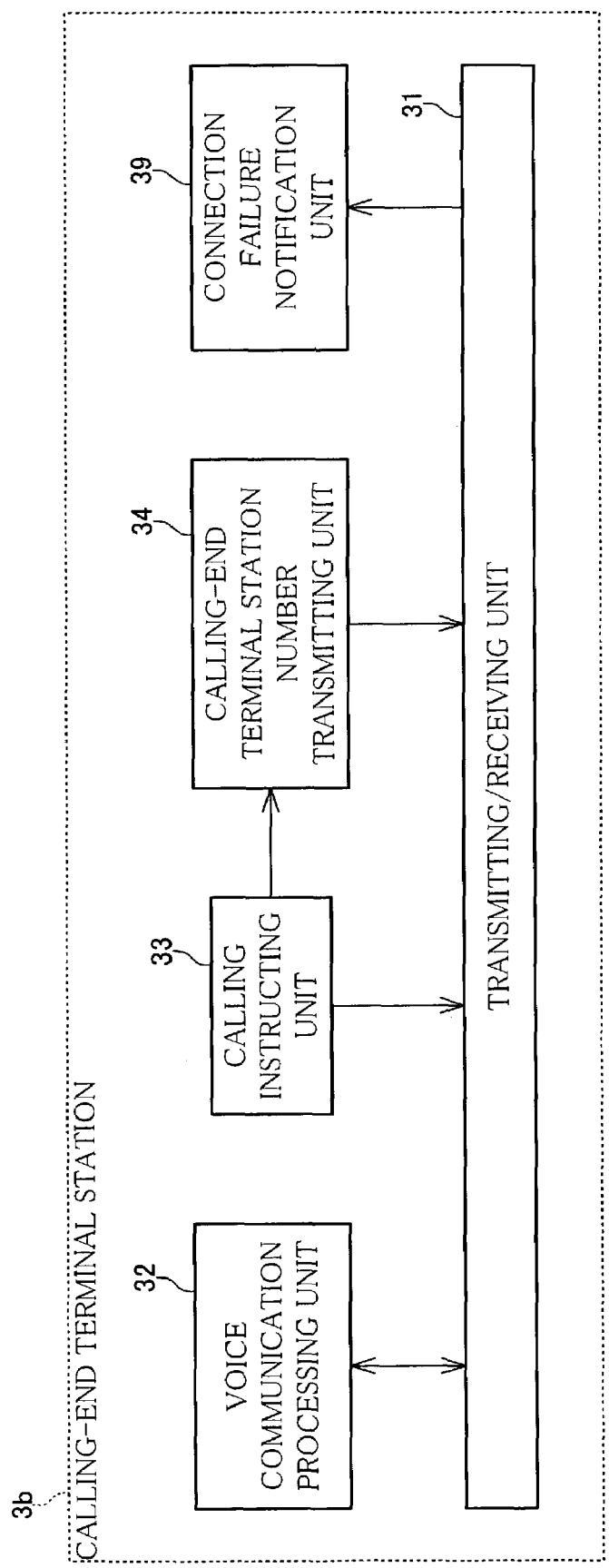
FIG. 7 is a block diagram of the configuration of major parts of a calling-end terminal station in the communications system.

A communications system 1b of the present embodiment, as shown in FIG. 6, is configured so that the calling party information server 9 receives the calling end and called-end terminal station numbers from the called-end terminal station 5b and that the called-end terminal station number transmitting unit 35 shown in FIG. 1 is missing from the calling-end terminal station 3b as shown in FIG. 7. The calling-end-terminal-station-number transmitting unit 34 in the calling-end terminal station 3b is configured so as to transmit the calling-end terminal station number not to the calling party information server 9, but to the called-end terminal station 5b.

Figure 8:
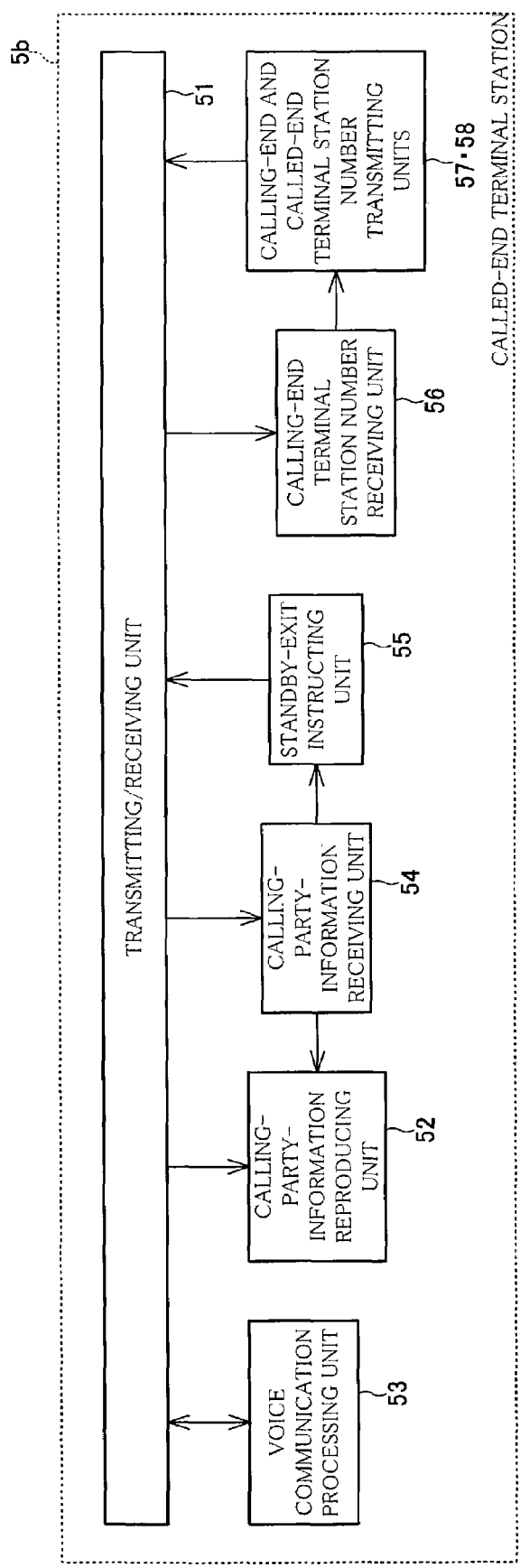
FIG. 8 is a block diagram of the configuration of major parts of a called-end terminal station in the communications system.

Meanwhile, as shown in FIG. 8, the called-end terminal station 5b includes, in addition to the configuration in FIG. 1, a calling-end terminal station number receiving unit 56 which receives a calling-end terminal station number from the calling-end terminal station 3b and calling end and called-end terminal station number transmitting units 57, 58 which transmit the calling-end terminal station number and a predetermined number of the device under consideration (called-end terminal station number) to the calling party information server 9. In the present embodiment, since the called-end terminal station 5b receives a calling-end terminal station number as transmitted data recited in a claim/claims, the calling-end terminal station number receiving unit 56 corresponds to the receiving means recited in a claim/claims and the calling-party-information receiving unit 54 to the alert data designating means and setting means recited there.

Further, as shown in FIG. 6, the communications network 7b of the present embodiment includes, in addition to the call-up control unit 71 in FIG. 1, a first called-end terminal station reaction detecting unit 72 which detects success or failure of the transmission of a calling-end terminal station number from the calling-end terminal station 3b to the called-end terminal station 5b, and a second called-end terminal station reaction detecting unit 73 which detects success or failure of the transmission of calling party information from the calling party information server 9 to the called-end terminal station 5b. The two reaction detecting units 72, 73 determine success or failure of the transmission according to, for example, whether or not a receiving end reports completion of the transmission after the transmitting end starts the transmission and before a predetermined time elapses, and if transmission fails, instructs the call-up control unit 71 to exit from connect ready (standby) mode and notifies the calling-end terminal station 3b that connect could not established.

Accordingly, as shown in FIG. 7, the calling-end terminal station 3b of the present embodiment is provided with a connection failure notification unit 39 which notifies the user of the reported connection failure. The calling-end-terminal-station-number transmitting unit 34 and the calling party information transmitting unit 94, constituting the transmitting end, are configured to notify the reaction detecting units 72, 73 of commencement of transmission, and the calling-end terminal station number receiving unit 56 and the calling-party-information receiving unit 54, constituting the receiving end, are configured to, when reception is completed, notify the reaction detecting units 72, 73 of the completion.

Figure 9:
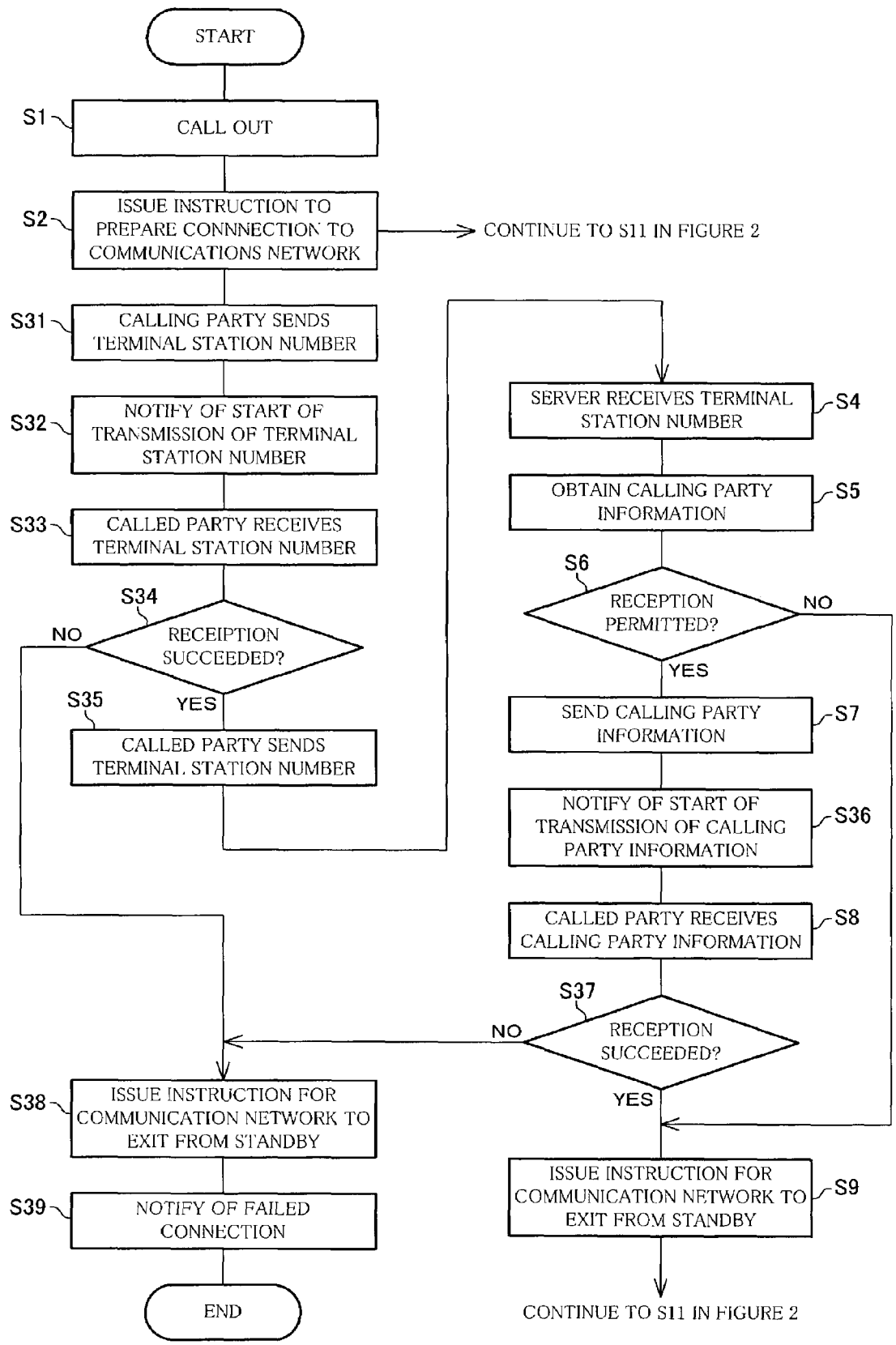
FIG. 9 is a flow chart describing operations of various parts of the communications system to initiate a call.

In the foregoing configuration, as shown in FIG. 9, S31 to S35 are executed in place of S3 in FIG. 2, with S36 to S39 newly added. S11 and its subsequent steps here are no different from those in FIG. 2, and the following description will focus on those steps executed prior to S11.

In S1 and S2, an instruction for a call is issued with the call-up control unit 71 of the communications network 7b being notified of a request to get prepared for connection to the called-end terminal station 5b. Then, in S31, the calling-end-terminal-station-number transmitting unit 34 in the calling-end terminal station 3b transmits the calling-end terminal station number to the called-end terminal station 5b by, for example, adding a predetermined sub-address to the number notification of the calling-end terminal station, calling the called-end terminal station 5b, and transmitting over a packet network. The calling-end-terminal-station-number transmitting unit 34, in S32, notifies the first called-end terminal station reaction detecting unit 72 of the communications network 7b of the transmission of the calling-end terminal station number.

Meanwhile, in the called-end terminal station 5b, the calling-end terminal station number receiving unit 56, when receiving the calling-end terminal station number (S33), notifies the first called-end terminal station reaction detecting unit 72 of the successful reception. This causes the first called-end terminal station reaction detecting unit 72 to determine that the calling-end terminal station number has been successfully transmitted (YES in S34), in which case, the calling end and called-end terminal station number transmitting units 57, 58 in the called-end terminal station 5b transmit the calling end and called-end terminal station numbers to the calling party information server 9 in S35.

The calling party information server 9 performs S4 to S7 in substantially the same manner as in FIG. 2. In S7, the calling party information transmitting unit 94 notifies the second called-end terminal station reaction detecting unit 73 of the commencement of the transmission of the calling party information as in S32 when transmitting the calling party information (S36). Further, the second called-end terminal station reaction detecting unit 73 determines, as in S34, success or failure of the transmission of the calling party information according to whether it receives any notice of the completion of the reception from the calling-party-information receiving unit 54 in the called-end terminal station 5b. If the transmission is successful, S9 and its subsequent steps are executed.

Meanwhile, for example, when the called-end terminal station 5b moves out of its communications coverage or cannot respond for any other reasons, the calling-end terminal station number receiving unit 56, the calling-party-information receiving unit 54, etc. cannot notify the two reaction detecting units 72, 73 of the completion of the transmission, in which case (NO in S34 or S37), the two reaction detecting units 72, 73 determine that they cannot connect to the called-end terminal station 5b and instruct the call-up control unit 71 of the communications network 7b to exit standby mode in S38 and instruct the connection failure notification unit 39 in the calling-end terminal station 3*b* in S39 to notify the user of the terminal station 3*b* of the failed connection by, for example, displaying or replaying a predetermined message or voice.

In the foregoing configuration, as with embodiment 1, the called-end terminal station 5*b* alerts the user of the called-end terminal station 5*b* to a call based on calling party information specified by the user of the calling-end terminal station 3*b*. As a result, the same effects are obtained as in embodiment 1. Further, in the present embodiment, the two reaction detecting units 72, 73 are provided to instruct the call-up control unit 71 to exit standby mode when the called-end terminal station 5*b* is unable to respond. As a result, the standby time can be cut down for more efficient use of resources of the communications network 7*b* when the called-end terminal station 5*b* is unable to respond, in comparison to configurations which do not detect the reaction of the called-end terminal station 5*b*

Embodiment 4

Embodiment 3 described, in a configuration similar to that of embodiment 1, the called-end terminal station 5*b* instructing the calling party information server 9 to transmit calling party information in response to an instruction from the calling-end terminal station 3*b*. By contrast, the present embodiment will describe, in a configuration similar to that of embodiment 2, a called end instructing the calling party information server to transmit calling party information in reference to FIGS. 10-13.

Figure 10:
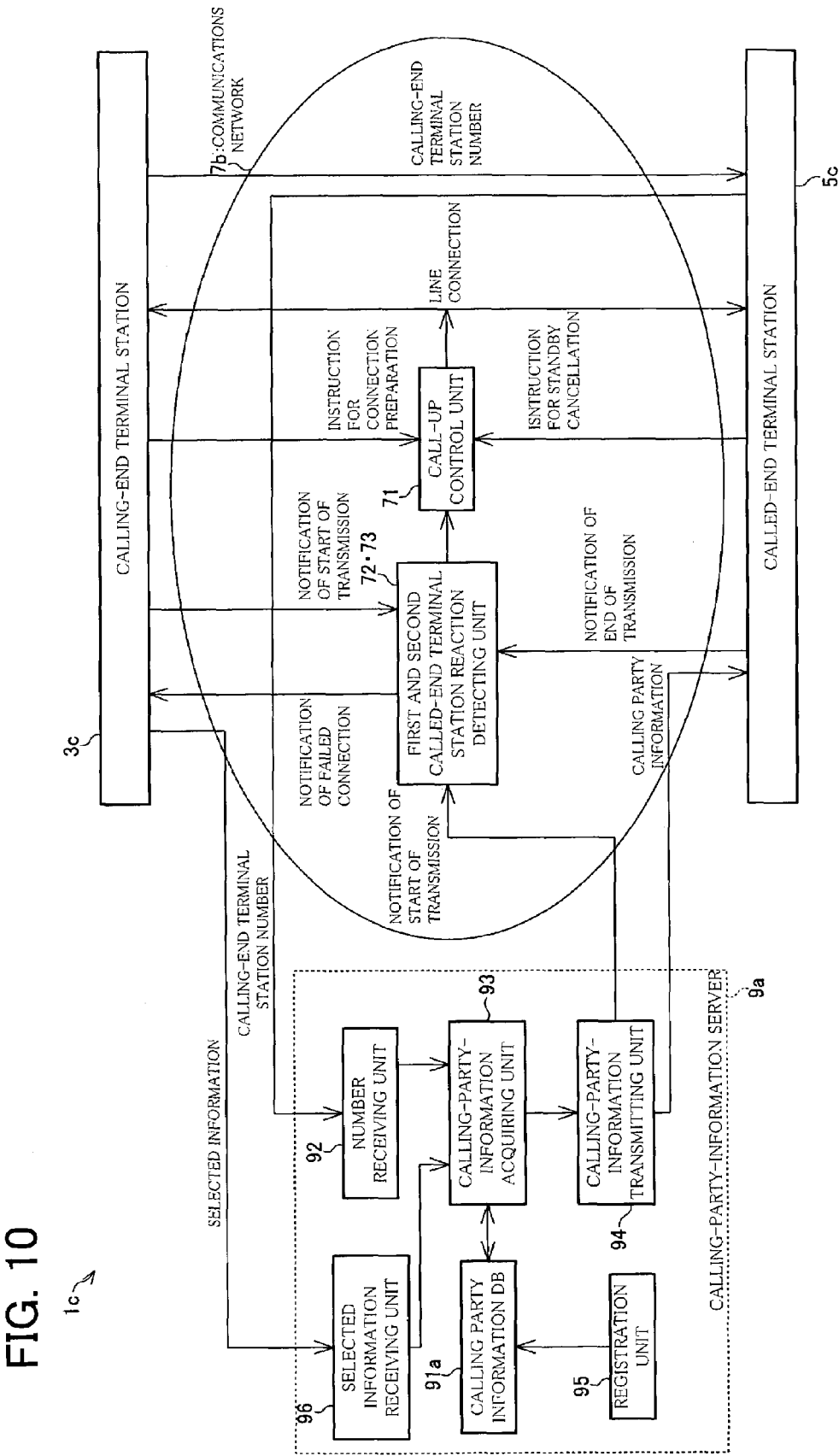
FIG. 10, showing another embodiment of the invention, is a block diagram of the configuration of major parts of a communications system.

A communications system 1*c* in accordance with the present embodiment is configured, as shown in FIG. 10, so that a calling-end terminal station 3*c* transmits selected information to a calling party information server 9*a*, and a called-end terminal station 5*c* transmits a calling-end terminal station number to the calling party information server 9*a* in response to an instruction from the calling-end terminal station 3*c*.

Figure 11:
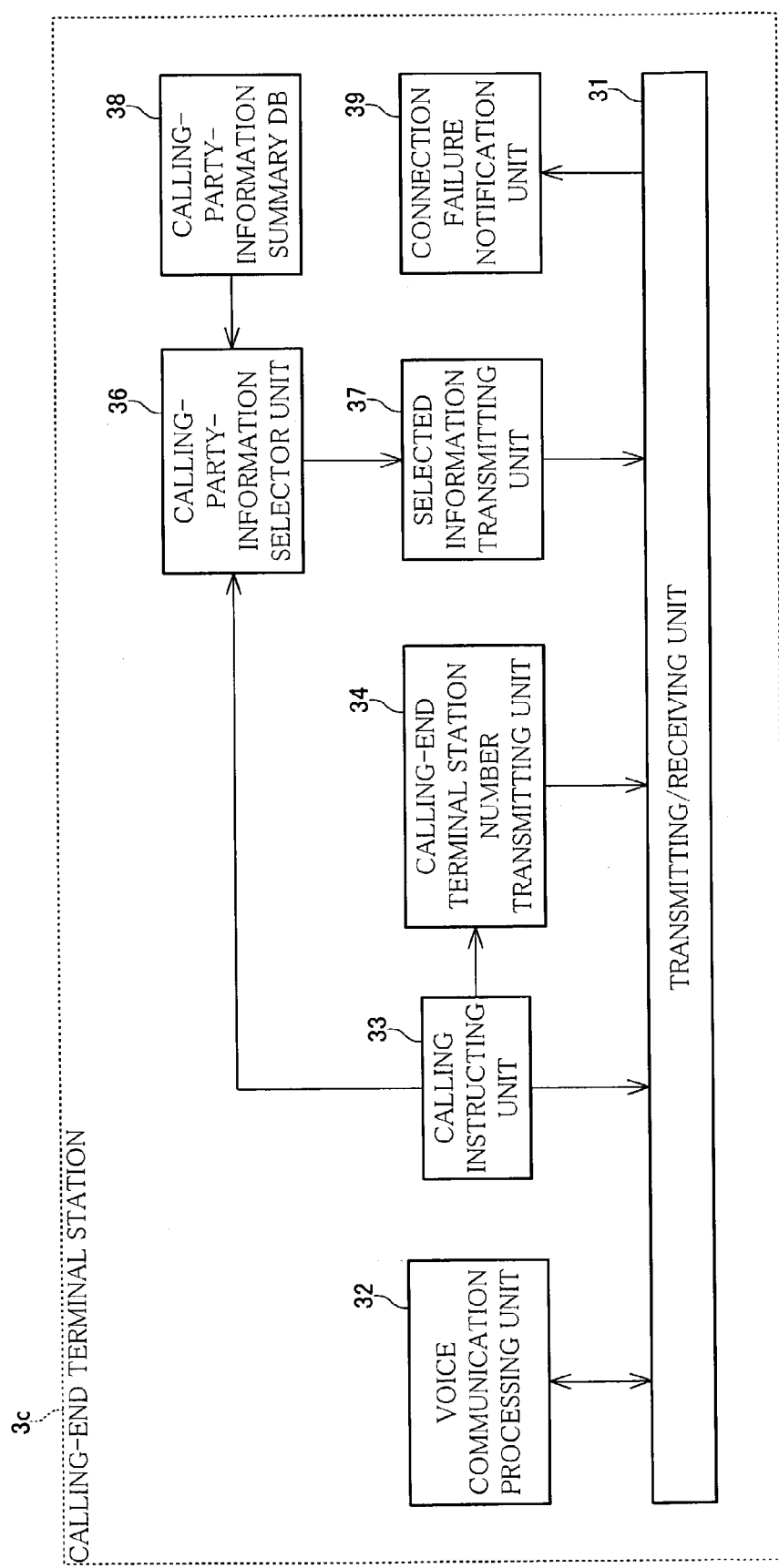
FIG. 11 is a block diagram of the configuration of major parts of a calling-end terminal station in the communications system.
Figure 12:
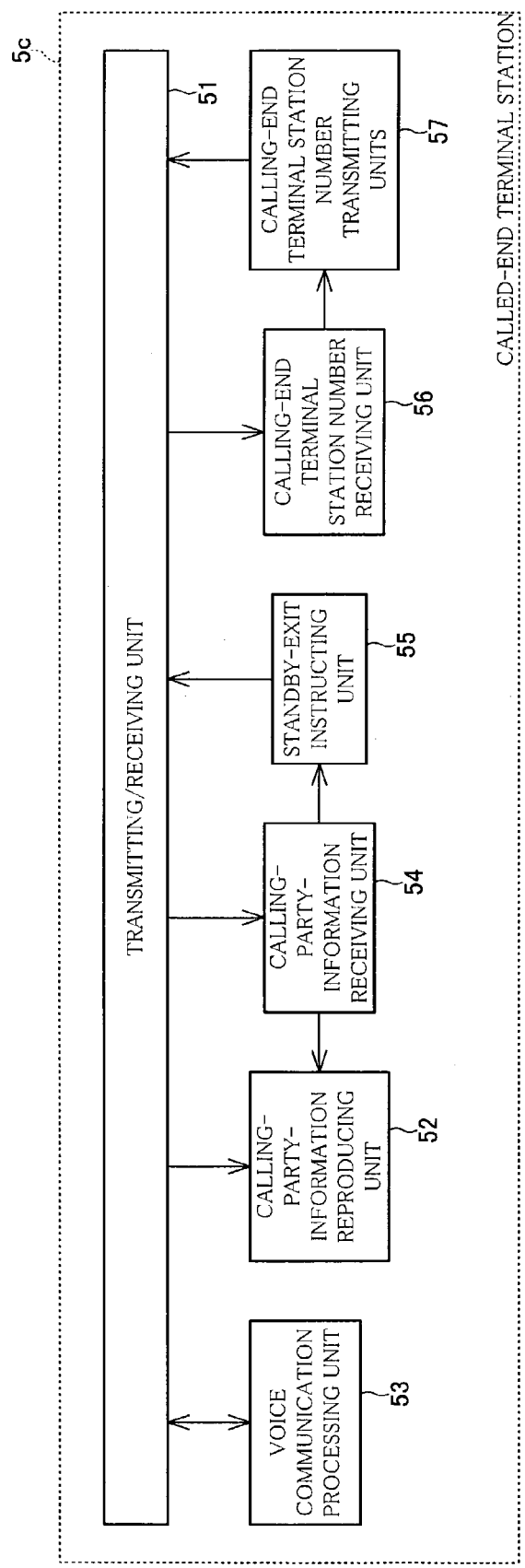
FIG. 12 is a block diagram of the configuration of major parts of a called-end terminal station in the communications system.

Specifically, referring to FIG. 11, the calling-end terminal station 3*c* is different from the calling-end terminal station 3*a* of FIG. 3 in that the former additionally includes a connection failure notification unit 39 of FIG. 7 and is thereby configured so that a calling-end-terminal-station-number transmitting unit 34 can notify the called-end terminal station 5*c* of a calling-end terminal station number. Further, since information is selectively transmitted from the calling-end terminal station 3*c* to the calling party information server 9*a*, as shown in FIG. 12, the called-end terminal station number transmitting unit 58 is missing from the called-end terminal station 5*c* of the present embodiment when compared with the configuration in FIG. 8. Similarly to the case in FIG. 6, a communications network 7*b* has two reaction detecting units 72, 73 so that a transmitting and receiving ends can notify of the start and end of a transmission. In the present embodiment, the calling party information is designated as identifiable transmitted data and received as such; therefore, similarly to embodiments 1, 2, the calling-party-information receiving unit 54 is an equivalent to the receiving means, alert data designating means, and setting means recited in claims.

Figure 13:
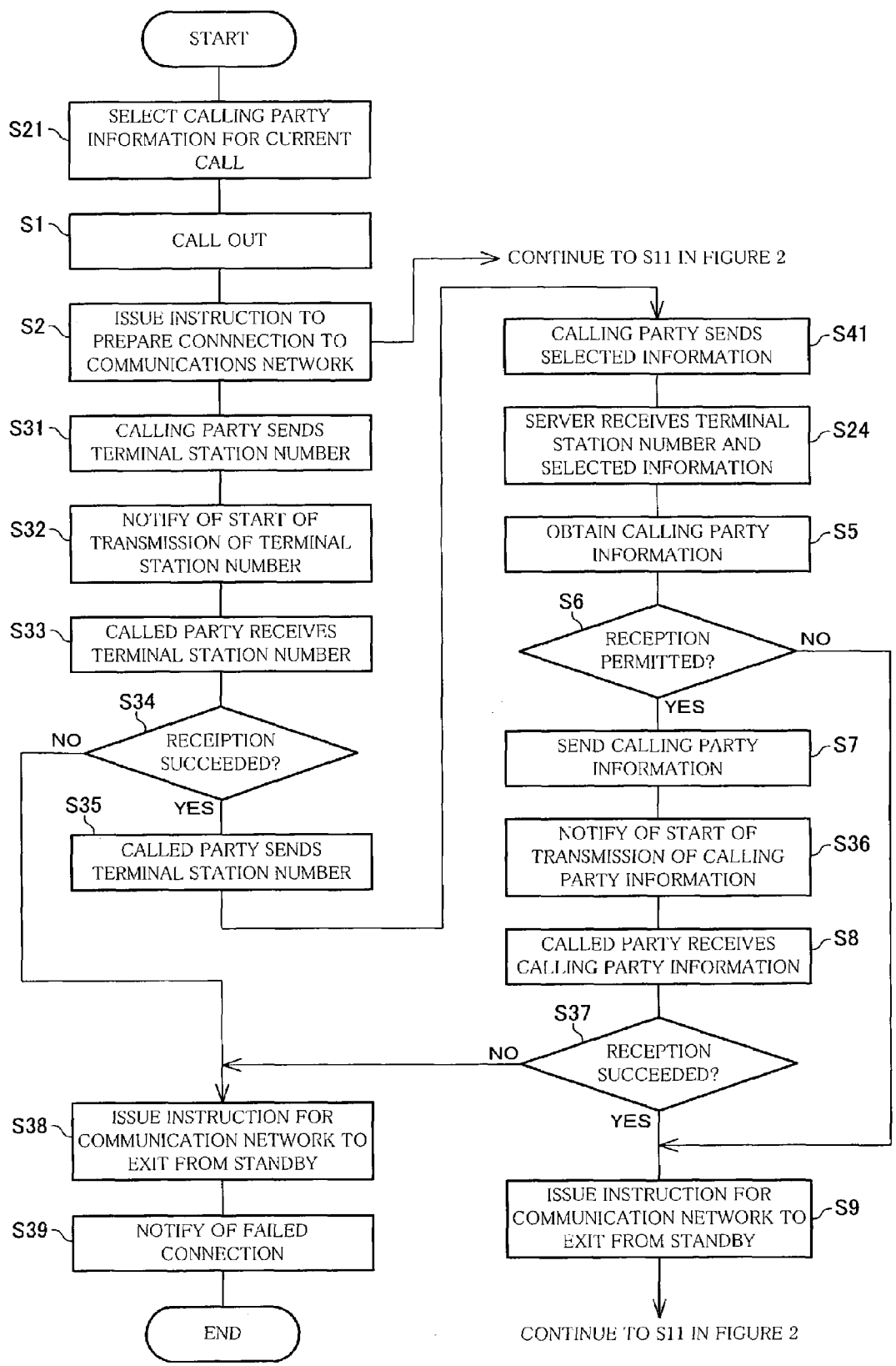
FIG. 13 is a flow chart describing operations of various parts of the communications system to initiate a call.

In this configuration, as shown in FIG. 13, the selecting step (S21) in FIG. 5 is executed in addition to those steps in FIG. 9. Further, similarly to the case in FIG. 9, in S1, S2, and S31 to S35, the calling-end terminal station 3*c* notifies the called-end terminal station 5*c* of a calling-end terminal station number, the called-end terminal station 5*c* notifies the calling party information server 9*a* of the calling-end terminal station number to instruct for a transmission of calling party information. However, in the present embodiment, the selected information is transmitted from the calling-end terminal station 3*c*; therefore, in S41, the selected information transmitting unit 37 in the calling-end terminal station 3*c* transmits the information selected in S21 representing the calling party information to the calling party information server 9*a*.

Thus, similarly to embodiment 2, the called-end terminal station Sc reproduces calling party information which is better suited to the conditions when a call is made, so that it can more appropriately inform the user of the called-end terminal station 5*c* of the conditions when the call is made. Besides, similarly to embodiment 3, since the two reaction detecting units 72, 73 are provided, the standby time can be cut short when the called-end terminal station 5*c* cannot respond, better utilizing the resources of the communications network 7*b*.

Embodiment 5

Embodiments 1-4 described the calling party information being transmitted to a called-end terminal station for each call. By contrast, in reference to FIGS. 6, 14, 15, the present embodiment will describe a configuration whereby the transmission of the calling party information that is stored in the called-end terminal station is suspended. Similarly to embodiments 1, 3, the present embodiment will describe the calling party information identified as a combination of a calling-end-terminal-station number and a called-end-terminal-station number.

Figure 14:
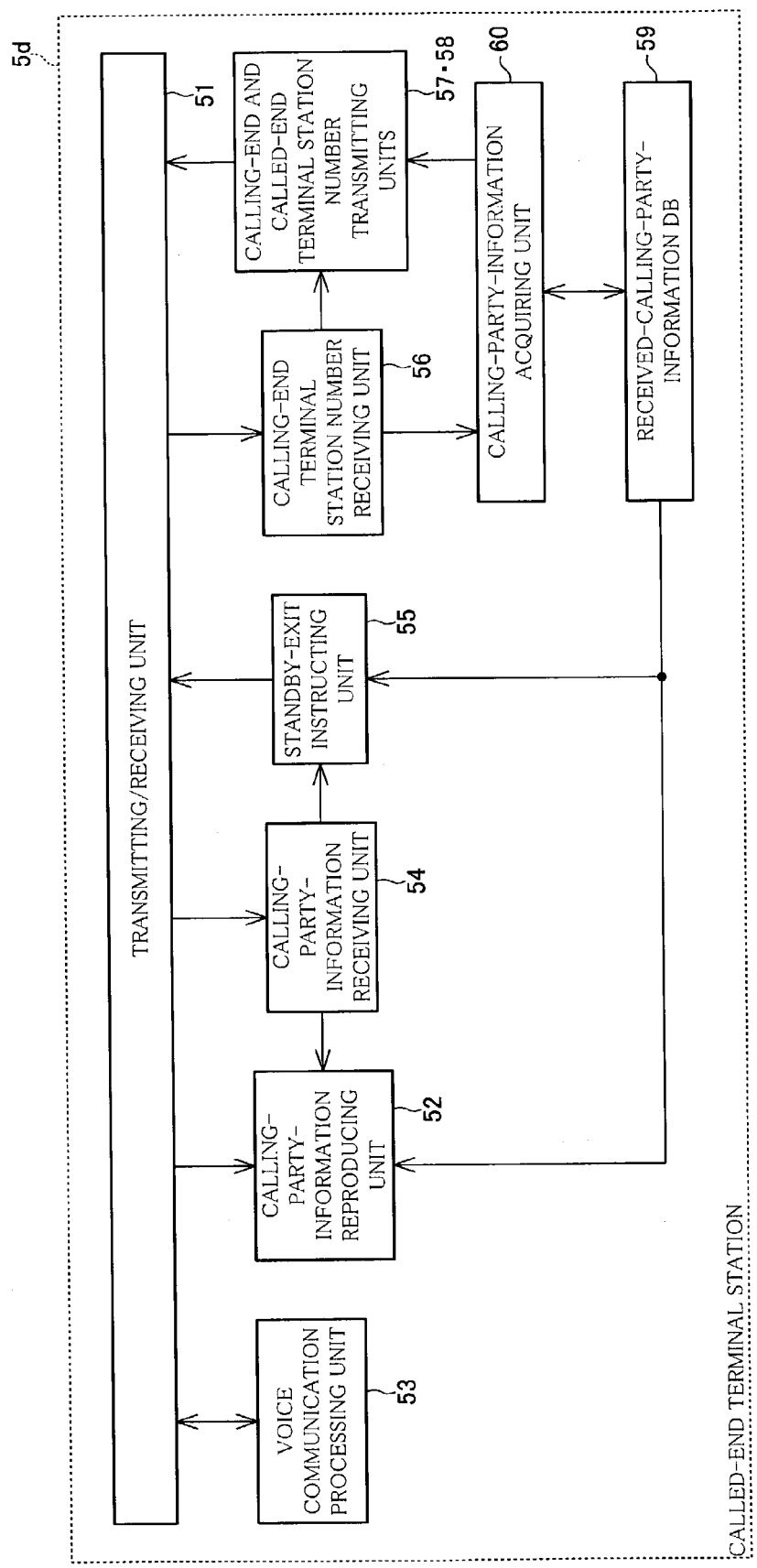
FIG. 14, showing another embodiment of the invention, is a block diagram of the configuration of major parts of a communications system.

As shown in FIG. 6, there is provided a called-end terminal station 5*d* in a communications system 1*d* of the present embodiment. As shown in FIG. 14, the called-end terminal station 5*d* is different from the configuration in FIG. 8 in that the station 5*d* additionally includes a received-calling-party-information DB (storage means) 59 and a calling-party-information acquiring unit (calling party information acquiring means or transmission inhibiting means) 60. The received-calling-party-information DB 59 accumulatively stores the calling party information received so far, in association with a calling-end-terminal-station number. When the calling-end-terminal-station number transmitting unit 57 receives a calling-end-terminal-station number, the calling-party-information acquiring unit 60 accesses the received-calling-party-information DB 59 and detects whether the calling party information on the calling-end-terminal-station number is stored. In the present embodiment, similarly to embodiment 3, the calling-end-terminal-station number receiving unit 56 is an equivalent to the receiving means recited in claims, and the calling party information receiving unit 54 is an equivalent to the alert data designating means and the setting means.

Figure 15:
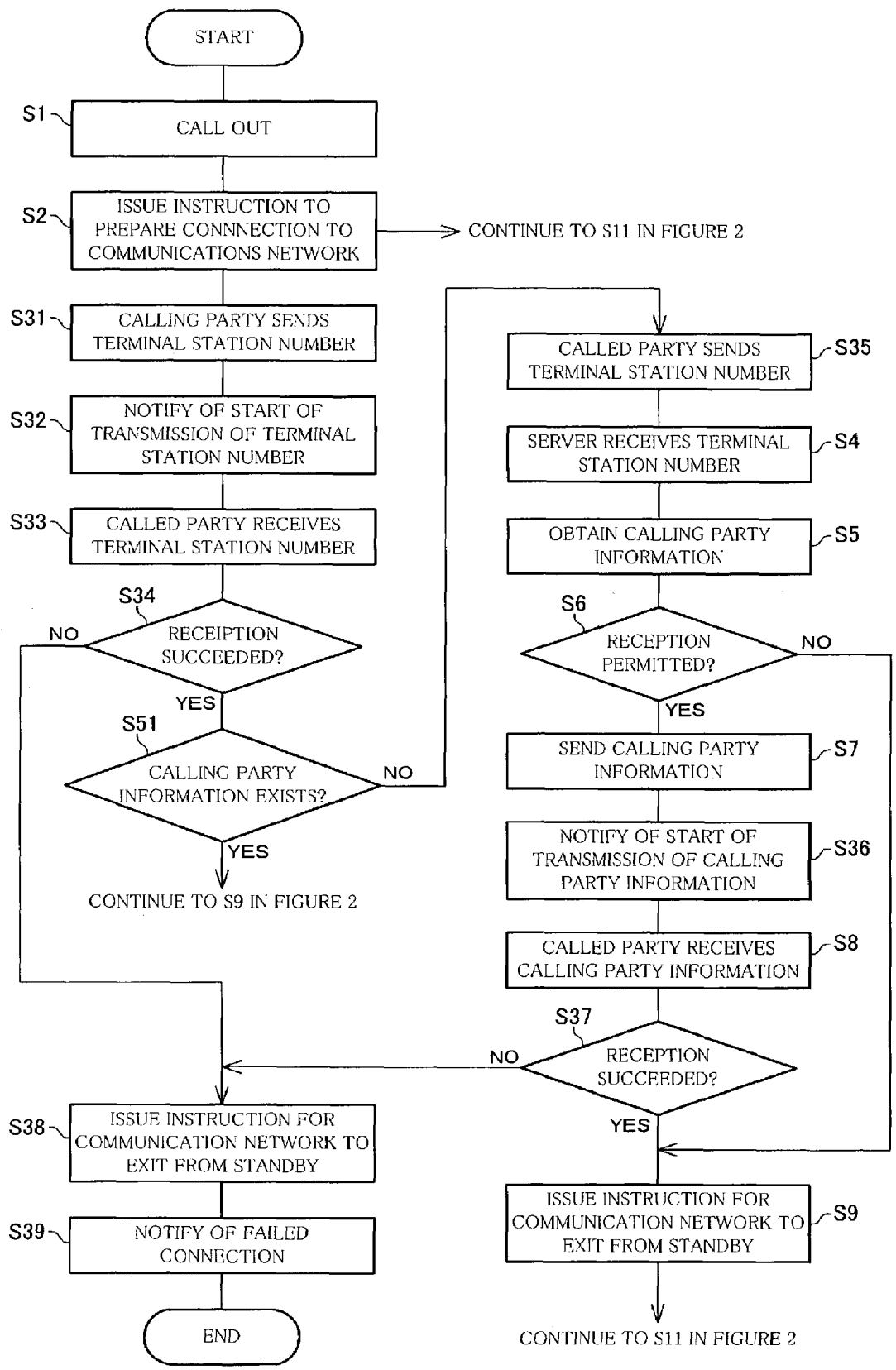
FIG. 15 a flow chart describing operations of various parts of the communications system to initiate a call.

In the configuration, as shown in FIG. 15, in addition to those steps shown in FIG. 9, when the calling-end-terminal-station number receiving unit 56 in the called-end terminal station 5*d* has successfully received a calling-end-terminal-station number (YES in S34), the calling-party-information acquiring unit 60 accesses received-calling-party-information DB 59 in S51 to determine whether there is stored calling party information corresponding to the calling-end-terminal-station number. If there is stored such calling party information (YES in S51), there is no need to receive the calling party information from the calling party information server 9; therefore, S9 and succeeding steps in FIG. 2 are executed so that the called-end terminal station 5*d* causes the call-up control unit 71 to go out of standby mode and the calling party information reproducing unit 52 alerts, in response to a call-up from the calling-end terminal station 3b, the user to the received call by reproducing the calling party information found in S51.

In contrast, if there is stored no calling party information corresponding to the calling-end-terminal-station number in the received-calling-party-information DB 59 (NO in S51), for example, if the outgoing call from the calling-end terminal station 3b has not received, S35 and succeeding steps are executed including the two terminal station number transmitting units 57, 58 transmitting the calling-end-terminal-station number and the called-end-terminal-station number to the calling party information server 9 in response to an instruction made from the calling-party-information acquiring unit 60.

In the configuration, when the calling party information is already stored in the called-end terminal station 5d, the transmission of calling party information from the calling party information server 9 to the called-end terminal station 5d is suspended. As a result, calling party information is transmitted infrequently compared to when calling party information is transmitted for each call. This reduces traffic from the communications network 7b to the called-end terminal station 5d and further reduces the traffic on the communications network 7b.

Embodiment 6

Figure 16:
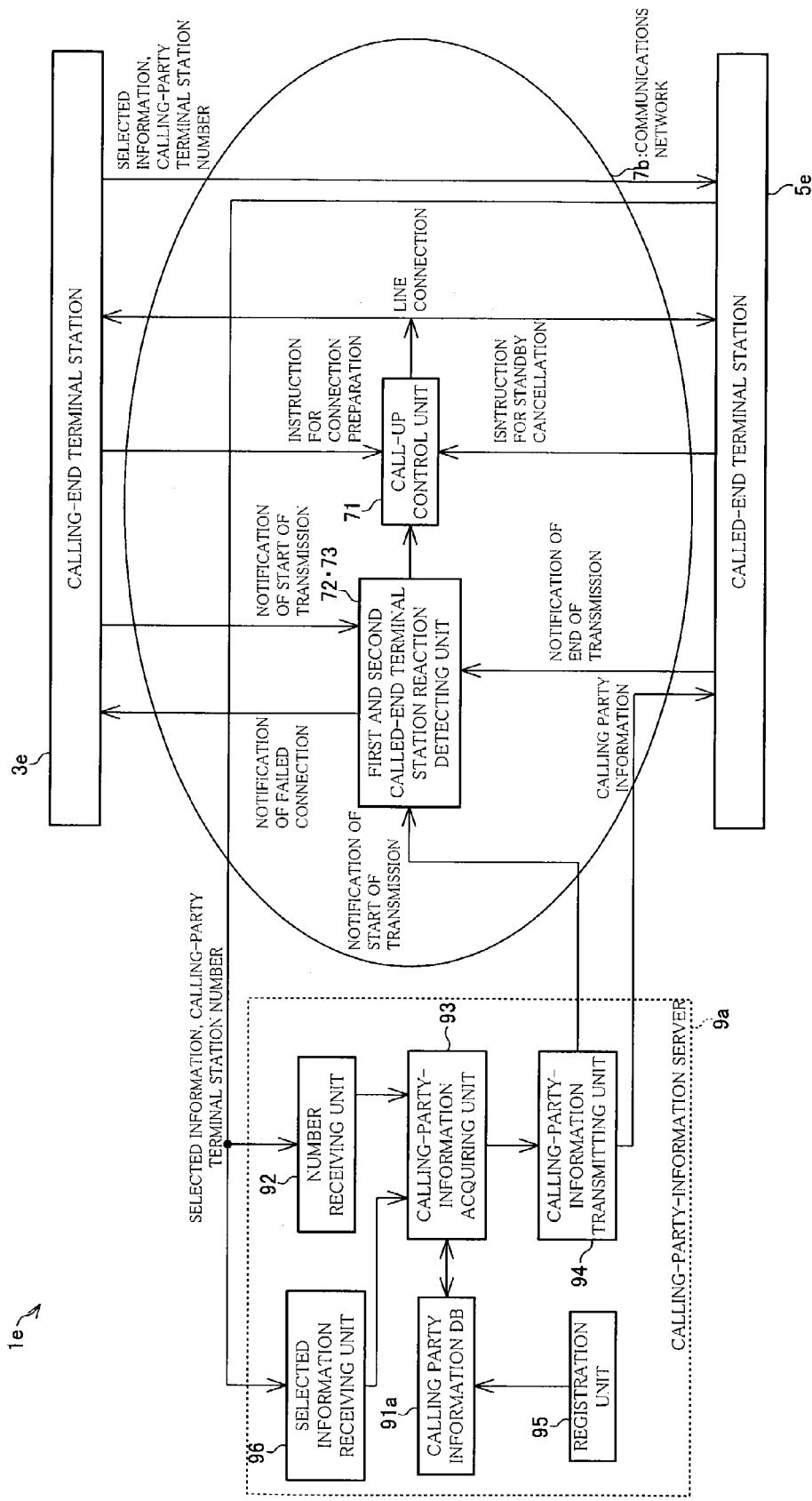
FIG. 16, showing another embodiment of the invention, is a block diagram of the configuration of major parts of a communications system.
Figure 17:
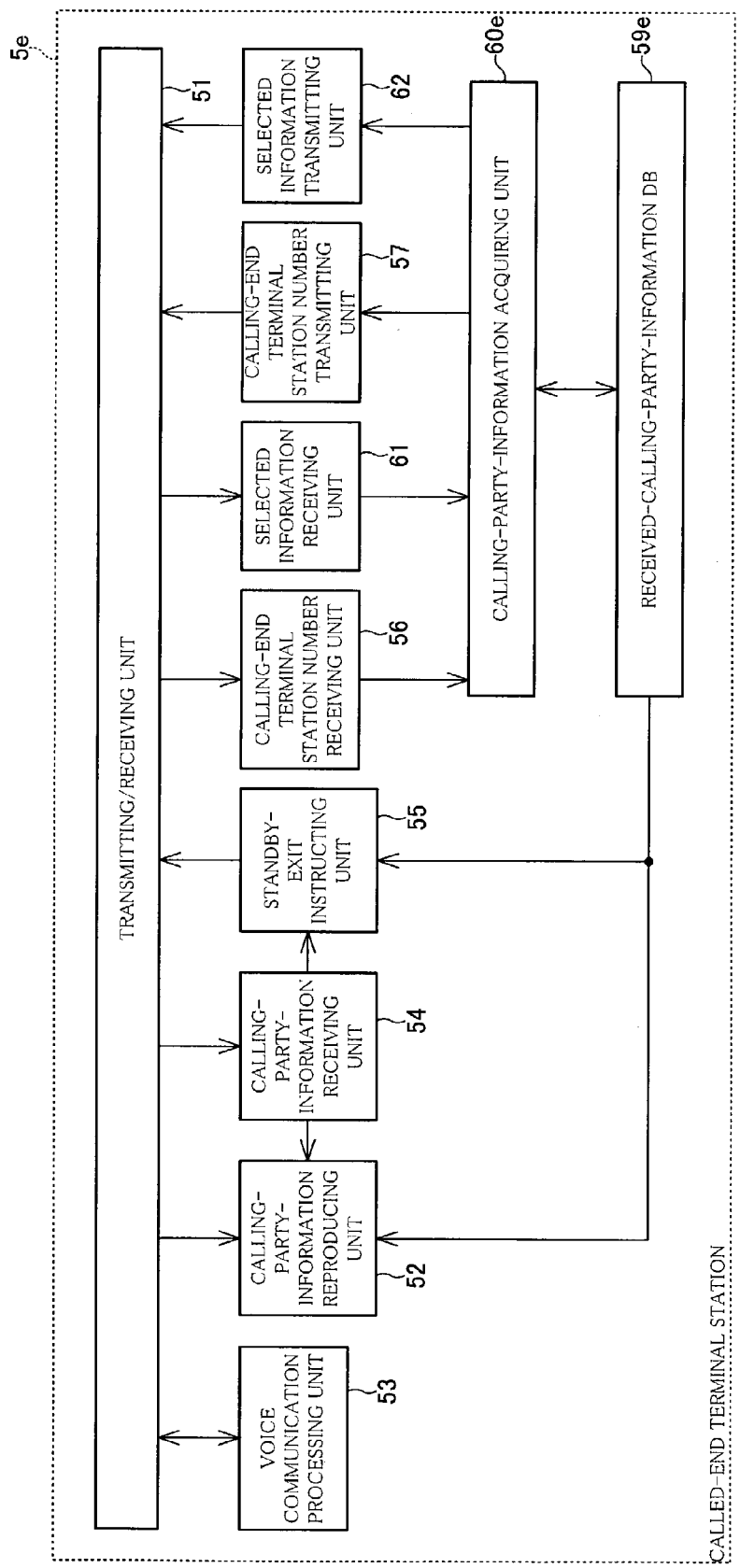
FIG. 17 is a block diagram of the configuration of major parts of a called-end terminal station in the communications system.
Figure 18:
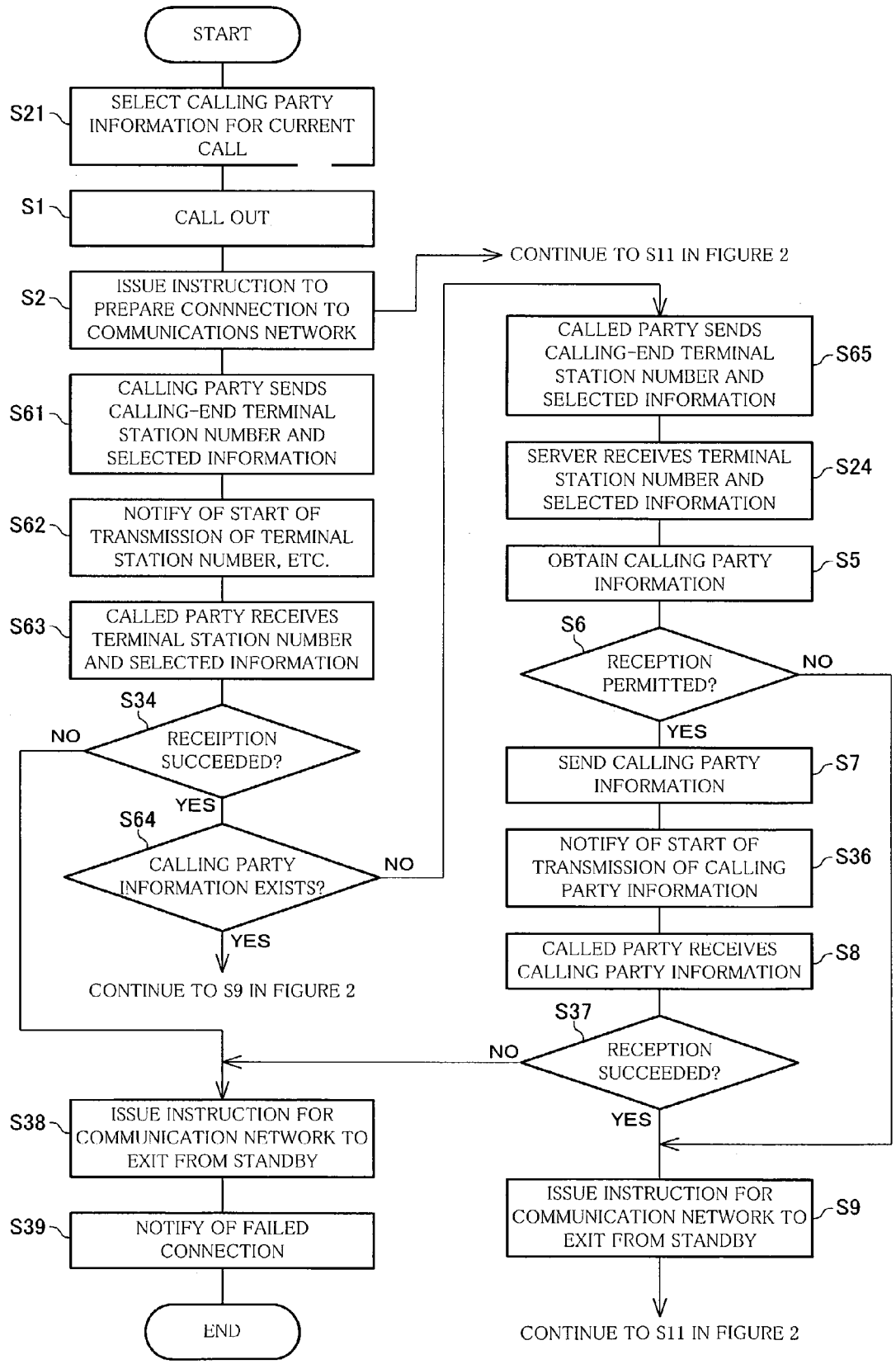
FIG. 18 is a flow chart describing operations of various parts of the communications system to initiate a call.

Similarly to embodiments 2, 4, in the configuration in which the calling party information is identified as a combination of a calling-end-terminal-station number and selected information, similarly to embodiment 5, the present embodiment will describe a case where the called-end terminal station is provided with a received-calling-party-information DB in reference to FIGS. 16-18.

As shown in FIG. 16, a communications system 1e of the present embodiment is configured so that both the calling-end-terminal-station number and the selected information are conveyed from a calling-end terminal station 3e to a called-end terminal station 5e, and only when there is stored no calling party information corresponding to both in a received-calling-party-information DB 59e in the called-end terminal station 5e, the called-end terminal station 5e instructs the calling party information server 9a to transmit calling party information.

Specifically, as shown in FIG. 17, the called-end terminal station 5e of the present embodiment is different from the configuration in FIG. 12 in that the station 5d additionally includes a received-calling-party-information DB 59e, a selected information receiving unit 61, and a calling-party-information acquiring unit 60e. The received-calling-party-information DB 59e accumulatively stores the calling party information receive so far, in association with a calling-end-terminal-station number and selected information. The selected information receiving unit 61 receives selected information from the selected information transmitting unit 37 (see FIG. 11) in the calling-end terminal station 3e. The calling-party-information acquiring unit 60e refers to the received-calling-party-information DB 59e based on the combination of the calling-end-terminal-station number and the selected information, and if there is stored no calling party information corresponding to the combination, instructs the calling-end-terminal-station number and the selected information conveyed by the calling-end terminal station 3e to be transmitted by the calling-end-terminal-station number transmitting unit 57 and the selected information transmitting unit 62. Incidentally, in the present embodiment, the calling-end-terminal-station number receiving unit 56 and the selected information receiving unit 61 are an equivalent to the receiving means recited in claims.

In the configuration, as shown in FIG. 18, the substantially same process as in FIG. 13 is done; however, in S61 to S63 provided to replace S31 to S33, the calling-end terminal station 3e transmits both the calling-end-terminal-station number and the selected information to the called-end terminal station 5e. Further, when both have been successfully received (YES in S34), the calling-party-information acquiring unit 60e in the called-end terminal station 5e refers to the received-calling-party-information DB 59e and, if there is already stored calling party information corresponding to them both (YES in S64), executes S9 and succeeding steps in FIG. 2 similarly to FIG. 15, so as to alert the user to the reception of the call by reproducing the calling party information. Meanwhile, if there is stored no corresponding calling party information (NO in S64), the calling-party-information acquiring unit 60e instructs the calling-end-terminal-station number transmitting unit 57 and the selected information transmitting unit 62, conveys the calling-end-terminal-station number and the selected information to the calling party information server 9a, and make an instruction to transmit the calling party information in S65. Thereafter, S24 and succeeding steps in FIG. 13 are executed, the called-end terminal station 5e reproduces the calling party information conveyed from the calling party information server 9a to alert the user to the reception of the call.

In the configuration, similarly to embodiment 5, when the calling party information is already stored in the stored called-end terminal station Se, the transmission of the calling party information from the calling party information server 9a to the called-end terminal station 5e is suspended. As a result, in addition to the advantages available in embodiments 2, 4, the traffic from the communications network 7b to the called-end terminal station Se can be reduced, and the traffic on the communications network 7b can be reduced.

In embodiments 5, 6, the calling party information stored in the received-calling-party-information DB (59, 59e) is reused; therefore, even if calling party information is modified at the calling end, the called-end terminal station (5d, 5e) may reproduce unmodified calling party information. Therefore, preferably, the calling-end terminal stations (3d, 3e) and the calling party information servers (9, 9a) transmit to the called-end terminal station the time last modified, valid period, flag, or any other information on the calling party information which shows whether there has been any change in the calling party information, and the called-end terminal station stores the information too in the received-calling-party-information DB to confirm whether there has been any modification. As the managing method of calling party information upon modification, one of the two is employed: whether to reproduce new calling party information in response to a user's instruction and whether to save both.

Further, in the foregoing two embodiments, the calling party information is stored. Therefore, when the called-end terminal station is sufficiently powerful, the original calling party information specified by the calling-end terminal station is preferably stored instead of the calling party information converted by the calling party information server according to the display capability of the called-end terminal station. In this case, the called-end terminal station needs to reproduce the calling party information while converting according to its own display capability; however, as the calling party information used when the called-end terminal station makes a call, the calling party information stored in the received-calling-party-information DB can be reused.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

According to the method of calling up a called party in accordance with the invention, the alert data reproduced by a called-end device upon the reception of a call before communications changes according to the calling party information determine at the calling end. Therefore, regardless of the fact that no alert data corresponding to the calling party is specified at the called end, the user of the called-end device can rely on the alert data to, for example, predict the calling party, assume how emergent the call is, and determine whether to respond to the call.

What is claimed is:

1. A method of calling a called party, such that prior to the communications step of causing a device on the calling end to communicate with a device on the called end over a communications network, the called end is selectively alerted to the reception of a call by reproducing alert data at the called end, the method comprising:
a determining step of determining calling party information at a calling end;
a transmitting step of conveying, to the called-end device, transmitted data representative of the calling party information determined in the determining step;
an alert data designating step of designating the calling party information represented by the transmitted data as the alert data; and
a determination step of determining at the called end whether the designated alert data should be reproduced or alerting should be performed according to predetermined settings with the reception of the call.

2. The method of calling up a called party as defined in claim 1, further comprising the specifying step of specifying in advance whether the calling party information is designated as the alert data.

3. The method of calling up a called party as defined in claim 1, wherein
the determining step includes the selecting step of selecting calling party information to be used in placement of a call from predetermined multiple sets of data that can be designated as calling party information when the call is placed.

4. The method of calling up a called party as defined in claim 1, wherein
the transmitting step includes the step in which a calling party information server provided on the communications network to store calling party information transmits to the called-end device calling party information as transmitted data in response to an instruction from the calling-end device.

5. The method of calling up a called party as defined in claim 1, further comprising the step in which, if the calling party information represented by the transmitted data received is not stored on the called-end device, the called-end device receives calling party information from a calling party information server provided on the communications network to store calling party information.

6. The method of calling up a called party as defined in either one of claims 4 and 5, further, comprising the timing adjusting step of delaying line connection between the calling-end device and the called-end device until the calling party information server completely transmits the calling party information.

7. The method of calling a called party as claimed in claim 1, wherein determination of whether or not alert data should be reproduced is performed in accordance with a setting, made in advance by the called party, corresponding to the conveyed calling party information.

8. The method as defined in claim 1, further comprising a step in which the calling party information is designated as the alert data if received calling party information represented by the transmitted data is stored on the called-end device.

9. The method as defined in claim 1, further comprising a step in which transmission of new calling party information from the communications network is inhibited if the received calling party information represented by the transmitted data is stored on the called-end device.

10. A communications apparatus including incoming call alerting means for selectively alerting a user to an incoming call by reproducing predetermined alert data, and communications means for when the incoming call is accepted, communicating with a calling-end device over a communications network, the apparatus comprising:
receiving means for receiving from the communications network transmitted data representative of calling party information specified by the calling-end device;
alert data designating means for designating the calling party information represented by the transmitted data as the alert data; and
determining means for determining if the designated alert data should be reproduced or alerting should be performed according to predetermined settings with the reception of the call.

11. The communications apparatus as defined in claim 10, further comprising specifying means for specifying whether or not to activate the alert data designating means.

12. The communications apparatus as defined in claim 10, further comprising calling party information acquiring means for accessing a predetermined calling party information server based on the transmitted data to receive calling party information represented by the transmitted data.

13. The communications apparatus as defined in claim 10, further comprising:
storage means for accumulatively storing calling party information in association with transmitted data received; and
transmission inhibiting means for, if there is stored calling party information corresponding to transmitted data received by the receiving means in the storage means, inhibiting transmission of new calling party information from the communications network.

14. The communications apparatus as claimed in claim 10, wherein the determining means refers to a setting, made in advance by the user, corresponding to the received calling party information to determine if the alert data should be reproduced.

15. The communications apparatus as defined in claim 10, further comprising:

storage means for accumulatively storing calling party information in association with the transmitted data thus received; and means, provided on the communications network, for causing the called-end device to receive calling party information from a calling party information server storing the calling party information if the calling party information corresponding to the transmitted data received by the receiving means is not stored in the storage means.

16. The communications apparatus as defined in claim 10, further comprising:

storage means for accumulatively storing calling party information in association with the transmitted data thus received; and designating means for designating the calling party information as alert data if the calling party information corresponding to the transmitted data received by the receiving means is stored in the storage means.

17. A call-up control system including a call-up control device, provided on a communications network, and connected with a calling-end device, a called-end device, a calling party information server, and a first detecting unit, the first detecting unit upon a transmission of a calling-end terminal station number from the calling-end device to the called-end device having been commenced during an attempt to establish connection between the called-end device and the calling-end device, detecting if said transmission is successful, wherein the call-up control device exits from a standby mode in which the call-up control device is attempting to establish connection between the called-end device and the calling-end device, when the first detecting unit detects that the transmission is not successful.

18. The call-up control system of claim 17, wherein the call-up control device is further connected with a second detecting unit, the second detecting unit detecting if a transmission of calling party information from the calling party information server to the called-end device is successful; and the call-up control device exits from a standby mode in which the call-up control device is attempting to establish connection between the called-end device and the calling-end device, when the second detecting unit detects that the transmission is not successful.

19. A method of calling a called party in which a device on a called end is alerted to the reception of a call from a device on the calling end prior to establishment of call communication between the calling-end device and the called-end device, the method comprising the steps of:

preparing a call communication connection in a communication network between the calling-end device and the called-end device;

transmitting calling party information from a server to the called-end device;

detecting if the transmission of the calling party information to the called-end device is successful; and determining if the call communication connection between the called-end device and the calling-end device should be established in accordance with the result of the detection.

* * * * *